United States Patent
Orth

(10) Patent No.: US 10,645,628 B2
(45) Date of Patent: May 5, 2020

(54) APPARATUS FOR INTERCONNECTING WIRELESS NETWORKS SEPARATED BY A BARRIER

(75) Inventor: Kelly Michael Orth, Apple Valley, MN (US)

(73) Assignee: Rosemount Inc., Shakopee, MN (US)

( * ) Notice: Subject to any disclaimer, the term of this patent is extended or adjusted under 35 U.S.C. 154(b) by 1442 days.

(21) Appl. No.: 12/717,638

(22) Filed: Mar. 4, 2010

(65) Prior Publication Data

US 2011/0216695 A1    Sep. 8, 2011

(51) Int. Cl.
| | |
|---|---|
| H04W 40/00 | (2009.01) |
| H04L 12/56 | (2006.01) |
| H04W 92/02 | (2009.01) |
| H04W 84/18 | (2009.01) |

(52) U.S. Cl.
CPC ........... *H04W 40/00* (2013.01); *H04W 92/02* (2013.01); *H04W 84/18* (2013.01)

(58) Field of Classification Search
CPC ............................... H04W 40/00; H04W 92/02
USPC .................................. 370/401, 310, 911, 328
See application file for complete search history.

(56) References Cited

U.S. PATENT DOCUMENTS

| | | | |
|---|---|---|---|
| 5,502,639 A | 3/1996 | Fukunaga et al. |
| 5,560,021 A | 9/1996 | Vook et al. |
| 5,862,391 A | 1/1999 | Salas et al. |
| 6,185,205 B1 | 2/2001 | Sharrit et al. |
| 6,185,208 B1 | 2/2001 | Liao |
| 6,301,527 B1 | 10/2001 | Butland et al. |
| 6,363,062 B1 | 3/2002 | Aaronsen et al. |
| 6,374,311 B1 | 4/2002 | Mahany et al. |
| 6,711,166 B1 | 3/2004 | Amir et al. |
| 6,731,946 B1 | 4/2004 | Stanwood et al. |
| 6,741,554 B2 | 5/2004 | D'Amico et al. |
| 6,775,276 B1 | 8/2004 | Beser |

(Continued)

FOREIGN PATENT DOCUMENTS

| | | | |
|---|---|---|---|
| JP | H08125600 A | 5/1996 |
| JP | 2002190772 A | 7/2002 |

(Continued)

OTHER PUBLICATIONS

International Search Report and Written Opinion of the Korean Intellectual Property Office in counterpart international Application No. PCT/US2011/000347, dated Nov. 22, 2011.

(Continued)

*Primary Examiner* — Yemane Mesfin
*Assistant Examiner* — Henry Baron
(74) *Attorney, Agent, or Firm* — Kinney & Lange, P.A.

(57) ABSTRACT

An apparatus for bridging a barrier to wireless communication between wireless field device networks includes a pair of locally-powered wireless devices connected by a wired link spanning the barrier. At least one of the locally-powered wireless devices is in wireless communication with each of the wireless networks intended to be interconnected. The wireless devices include a wireless transceiver and an antenna. Messages from one wireless field device network addressed to a member node of another wireless field device network are received by a wireless device on one side of the barrier and transmitted via the wired link to another wireless device on the other side of the barrier for routing to the member node of the other wireless field device network.

19 Claims, 16 Drawing Sheets

(56) References Cited

U.S. PATENT DOCUMENTS

| | | |
|---|---|---|
| 6,826,607 B1 | 11/2004 | Gelvin et al. |
| 6,832,251 B1 | 12/2004 | Gelvin et al. |
| 6,859,831 B1 | 2/2005 | Gelvin et al. |
| 6,891,838 B1 | 5/2005 | Petite et al. |
| 6,971,063 B1 | 11/2005 | Rappaport et al. |
| 6,990,189 B2 | 1/2006 | Ljubicich |
| 7,010,294 B1 | 3/2006 | Pytosia et al. |
| 7,035,773 B2 | 4/2006 | Keyes et al. |
| 7,042,352 B2 | 5/2006 | Kates |
| 7,053,770 B2 | 5/2006 | Ratiu et al. |
| 7,075,890 B2 | 7/2006 | Ozer et al. |
| 7,075,892 B2 | 7/2006 | Grover et al. |
| 7,099,295 B1* | 8/2006 | Doyle et al. ............... 370/338 |
| 7,114,388 B1 | 10/2006 | French et al. |
| 7,130,915 B1 | 10/2006 | Rustad |
| 7,139,239 B2 | 11/2006 | McFarland |
| 7,155,228 B2 | 12/2006 | Rappaport et al. |
| 7,187,277 B2 | 3/2007 | Kobayashi |
| 7,233,745 B2 | 6/2007 | Loechner |
| 7,246,045 B1 | 7/2007 | Rappaport et al. |
| 7,262,693 B2 | 8/2007 | Karschnia et al. |
| 7,277,401 B2 | 10/2007 | Kyperountas et al. |
| 7,327,998 B2 | 2/2008 | Kumar et al. |
| 7,339,489 B2 | 3/2008 | Arita et al. |
| 7,376,137 B2* | 5/2008 | Sung et al. ............... 370/401 |
| 7,379,137 B2 | 5/2008 | Sung et al. |
| 7,388,886 B2 | 6/2008 | Perkins et al. |
| 7,406,060 B2 | 7/2008 | Periyalwar et al. |
| 7,424,698 B2 | 9/2008 | Honary et al. |
| 7,436,790 B2 | 10/2008 | Todd et al. |
| 7,437,596 B2 | 10/2008 | McFarland |
| 7,440,436 B2 | 10/2008 | Cheng et al. |
| 7,460,865 B2 | 12/2008 | Nixon et al. |
| 7,468,969 B2 | 12/2008 | Zuniga |
| 7,489,282 B2 | 2/2009 | Lastinger et al. |
| 7,505,734 B2 | 3/2009 | Ratiu et al. |
| 7,515,608 B2 | 4/2009 | Yuan et al. |
| 7,536,167 B2 | 5/2009 | Gollnich et al. |
| 7,554,941 B2 | 6/2009 | Ratiu et al. |
| 7,558,622 B2 | 7/2009 | Tran |
| 7,562,393 B2 | 7/2009 | Buddhikot et al. |
| 7,564,842 B2 | 7/2009 | Callaway, Jr. et al. |
| 7,581,053 B2 | 8/2009 | Sichner et al. |
| 7,610,049 B2 | 10/2009 | Watanabe |
| 7,620,409 B2 | 11/2009 | Budampati et al. |
| 7,639,158 B2 | 12/2009 | Kobayashi |
| 7,640,007 B2 | 12/2009 | Chen et al. |
| 7,680,460 B2 | 3/2010 | Nelson et al. |
| 7,697,893 B2 | 4/2010 | Kossi et al. |
| 7,701,858 B2 | 4/2010 | Werb et al. |
| 7,705,729 B2 | 4/2010 | Broad et al. |
| 2002/0167954 A1 | 11/2002 | Highsmith et al. |
| 2002/0178273 A1 | 11/2002 | Pardo-Castellote et al. |
| 2004/0001084 A1 | 1/2004 | Shrinidhi et al. |
| 2004/0259554 A1 | 12/2004 | Rappaport et al. |
| 2004/0259555 A1 | 12/2004 | Rappaport et al. |
| 2005/0030968 A1* | 2/2005 | Rich ............... H04W 74/06 370/449 |
| 2005/0074019 A1 | 4/2005 | Handforth et al. |
| 2005/0147119 A1 | 7/2005 | Tofano |
| 2005/0149940 A1 | 7/2005 | Calinescu et al. |
| 2005/0192037 A1 | 9/2005 | Nanda et al. |
| 2005/0192727 A1 | 9/2005 | Shostak et al. |
| 2005/0201349 A1 | 9/2005 | Budampati |
| 2005/0213612 A1 | 9/2005 | Pister et al. |
| 2005/0220063 A1* | 10/2005 | Hong et al. ............... 370/338 |
| 2005/0223110 A1 | 10/2005 | Honary et al. |
| 2005/0238058 A1 | 10/2005 | Pierce, Jr. et al. |
| 2006/0002368 A1 | 1/2006 | Budampati et al. |
| 2006/0028997 A1 | 2/2006 | McFarland |
| 2006/0029060 A1 | 2/2006 | Pister |
| 2006/0029061 A1 | 2/2006 | Pister et al. |
| 2006/0039298 A1 | 2/2006 | Zuniga et al. |
| 2006/0064477 A1 | 3/2006 | Renkis |
| 2006/0095539 A1 | 5/2006 | Renkis |
| 2006/0111040 A1 | 5/2006 | Jenkins et al. |
| 2006/0159024 A1 | 7/2006 | Hester |
| 2006/0193262 A1 | 8/2006 | McSheffrey et al. |
| 2006/0215582 A1 | 9/2006 | Castagnoli et al. |
| 2006/0215627 A1 | 9/2006 | Waxman |
| 2006/0219861 A1 | 10/2006 | Wood |
| 2006/0221949 A1 | 10/2006 | Anjum |
| 2006/0227729 A1 | 10/2006 | Budampati et al. |
| 2006/0256722 A1 | 11/2006 | Taha et al. |
| 2006/0274644 A1 | 12/2006 | Budampati et al. |
| 2006/0274671 A1 | 12/2006 | Budampati et al. |
| 2006/0287001 A1 | 12/2006 | Budampati et al. |
| 2007/0030816 A1 | 2/2007 | Kolvaennu |
| 2007/0030832 A1 | 2/2007 | Gonia et al. |
| 2007/0053295 A1 | 3/2007 | Cleveland et al. |
| 2007/0071006 A1 | 3/2007 | Bosch et al. |
| 2007/0147255 A1 | 6/2007 | Oyman |
| 2007/0160020 A1 | 7/2007 | Osann |
| 2007/0165656 A1* | 7/2007 | Dobrowski et al. ......... 370/401 |
| 2007/0183439 A1 | 8/2007 | Ossan, Jr. |
| 2007/0184852 A1 | 8/2007 | Johnson et al. |
| 2007/0206503 A1 | 9/2007 | Gong et al. |
| 2007/0206547 A1 | 9/2007 | Gong et al. |
| 2007/0206616 A1 | 9/2007 | Orth |
| 2007/0223310 A1 | 9/2007 | Tran |
| 2007/0230403 A1 | 10/2007 | Douglas et al. |
| 2007/0248047 A1 | 10/2007 | Shorty et al. |
| 2007/0257791 A1 | 11/2007 | Arita et al. |
| 2007/0297366 A1 | 12/2007 | Osann |
| 2008/0125177 A1 | 5/2008 | Gupta |
| 2008/0273486 A1 | 11/2008 | Pratt, Jr. et al. |
| 2008/0274766 A1 | 11/2008 | Pratt, Jr. et al. |
| 2008/0278145 A1 | 11/2008 | Wenger |
| 2008/0279155 A1 | 11/2008 | Pratt, Jr. et al. |
| 2008/0279204 A1 | 11/2008 | Pratt, Jr. et al. |
| 2008/0298275 A1 | 12/2008 | De Sousa |
| 2008/0304458 A1* | 12/2008 | Aghvami et al. ............. 370/338 |
| 2009/0010203 A1 | 1/2009 | Pratt, Jr. et al. |
| 2009/0010204 A1 | 1/2009 | Pratt, Jr. et al. |
| 2009/0010205 A1 | 1/2009 | Pratt, Jr. et al. |
| 2009/0010233 A1 | 1/2009 | Pratt, Jr. et al. |
| 2009/0022121 A1 | 1/2009 | Budampati et al. |
| 2009/0125713 A1 | 5/2009 | Karschnia et al. |
| 2009/0222541 A1 | 9/2009 | Monga et al. |
| 2009/0224906 A1 | 9/2009 | Balgard et al. |
| 2009/0316628 A1 | 12/2009 | Enns et al. |
| 2010/0067505 A1* | 3/2010 | Fein et al. ............... 370/338 |
| 2010/0223480 A1* | 9/2010 | Fratti et al. ............... 713/300 |

FOREIGN PATENT DOCUMENTS

| | | |
|---|---|---|
| WO | WO0228123 A2 | 4/2002 |
| WO | WO03023536 | 3/2003 |

OTHER PUBLICATIONS

Acromag Incorporated, "Introduction to PROFIBUS DP," ProfiBus/RS485 Network I/O Modules, Technical Reference. 2002.

The Japanese Office Action dated Dec. 10, 2014 for Japanese Application No. 2012-556059.

Extended European Search Report for EP Application No. 11751009.9, dated Feb. 24, 2016, 5 pages.

European Examination Report, for European Patent Application No. 11751009.9, dated Jan. 17, 2017, 4 pages.

European Office Action, for European Patent Application No. 11751009.9, dated Jan. 24, 2018, 4 pages.

Indian Examiner's Report dated Feb. 22, 2019, received for corresponding India Application No. 5505/DELNP/2012, 8 pages.

\* cited by examiner

APPARATUS FOR INTERCONNECTING WIRELESS NETWORKS SEPARATED BY A BARRIER

BACKGROUND

The present invention relates generally to wireless networks and, more particularly, to interconnecting wireless field device networks that are separated either logically or physically from each other by a barrier to wireless communication.

A wireless field device network includes of a cloud of devices or nodes with a central controller or gateway. The nodes in the wireless network are able to both send and receive information. In a star network, exemplified by the popular Bluetooth® format, the reach of the network is limited by the transmission range of a master device. All communications from slave devices are routed through the master according to the master's communications schedule. The range of the wireless star network can be extended by allowing the slave devices to be members of different networks so that communications can be relayed from master to slave device through multiple networks in a scatternet fashion. Star networks can also create a genealogical relationship among interconnected networks; slave devices becoming master devices of child networks. The use of a star network topology imposes some inefficiency in the routing of communications as there is rigidity to the master-slave relationship that can force messages to take a suboptimal path to the destination node.

Mesh networking is a more flexible network architecture that is becoming prevalent in industrial applications. A mesh network includes a cloud of nodes and a controller or gateway, but avoids many of the limitations of the star network topology by allowing neighboring nodes within the same network to communicate directly with each other, avoiding unnecessary routing of communications to the controller. Each node is assigned multiple communications pathways that are interchanged to compensate for bottlenecks and linkage failures. By allowing neighboring nodes to form communications relays directly to the target node, and by routing around failures or bottlenecks, network response time is improved while minimizing network power usage by minimizing the number of transmissions required to relay a message. Utilizing multiple communications pathways provides path diversity which improves network reliability. Mesh networks can also communicate with each other by sharing nodes. These shared nodes can keep the communications schedule of every network in which it is a part, using an algorithm to determine priority between networks when there is a conflict.

Wireless networks are independent when the wireless networks do not or cannot communicate with each other. A barrier to communication can range from physical obstacles, such as long distances to natural obstructions (such as hills or trees), or man made impediments (such as concrete construction), or to logical problems inherent to the networks, such as differences in network protocols. The lack of communication between networks is inefficient, and potentially dangerous. When control systems are unable to monitor subsystems located in different independent networks, the utility of a centrally located control system is dramatically reduced. The challenge of linking disparate independent networks is that the solution must be flexible, reliable, and effective while being inexpensive. Common methods of interconnecting independent wireless networks, such as using gateways connected by an intranet backbone or by a separate wireless backbone (e.g., Wi-Fi), or radio repeaters, or home run network cabling require large outlays for installation of expensive wiring and equipment. Another issue with these mechanisms is that they often require an external power source, not readily available or practicable in many areas that are serviced by wireless field device networks.

The term "field device" refers to any field-mounted device that performs a function in a control or process monitoring system or plant monitoring system, including all devices used in the measurement, control and monitoring of industrial plants, processes or process equipment, including plant environmental, health and safety devices. A field device typically includes a sensor or an actuator or both and may perform a control or alert function. In wireless network systems designed for sensor/actuator-based applications, many devices in the network must be locally-powered because power utilities, such as 120V AC utilities or powered data buses, are not located nearby or are not allowed into hazardous locations where instrumentation, sensors, and actuators and safety monitors or human interface devices must be located without incurring great installation expense. "Locally-powered" means powered by a local power source, such as a self-contained electrochemical source (e.g., long-life batteries or fuel cells) or by a low-power energy-scavenging power source (e.g., vibration, solar, or thermoelectric). A common characteristic of local power sources is their limited energy capacity or limited power capacity, either stored, as in the case of a long-life battery, or produced, as in the case of a solar panel. Often, the economic need for low installation cost drives the need for battery-powered devices communicating as part of a wireless field device network. Effective utilization of a limited power source, such as a primary cell battery which cannot be recharged, is vital for a well functioning wireless field device. Batteries are expected to last more than five years and preferably last as long as the life of the product.

In order to save power, some wireless network protocols limit the amount of traffic any node or device can handle during any period of time by only turning their transceivers ON for limited amounts of time to listen for messages. Thus, to reduce average power, the protocol may allow duty-cycling of the transceivers between ON and OFF states. Some wireless network protocols may use a global duty cycle to save power such that the entire network is ON and OFF at the same time. Other protocols (e.g., TDMA-based protocols) may use a local duty cycle where only the communicating pair of nodes that are linked together are scheduled to turn ON and OFF in a synchronized fashion at predetermined times. Typically, the link is predetermined by assigning the pair of nodes a specific time slot for communications, an RF frequency channel to be used by the transceivers, who is to be receiving, and who is to be transmitting at that moment in time (e.g., a TDMA with channel hopping protocol, such as WirelessHART®).

Wireless field device networks are used to control and monitor disparate processes and environments. For example, wireless field device networks may be used in oil fields. An oil field is composed of numerous discrete locations centered on well pads that are scattered over large areas. Communication between these isolated local areas is essential to the overall management of the field. The wireless field device network at a well pad monitors and controls everything from flow rates and fluid temperature to valve status and position and potential leaks. The resulting data is relayed through the network to controllers that analyze the data and actuate control mechanisms in order to manage production or prevent trouble. Home run cabling from each isolated well pad to a centrally monitored station may be impractically expensive, so often times a wireless Supervisory and Control Data Acquisition system (SCADA) is employed to connect the well pads together into a star network. However, SCADA systems are expensive to install and often require expensive solar panels with battery backup to power them. The oil field environment can be extremely difficult for a wireless mesh network to operate reliably. Distances between well pads are often greater than the standard range of a wireless field device and there are often physical obstructions to wireless communication, such as earthen berms, tanks, processing equipment, rocker/rod pumps and sheds. Wireless links between networks are often blocked by natural vegetation, such as trees and bushes. Trees absorb 2.4 GHz spectrum radio emissions at ~0.35 dB/m, rapidly consuming the link budget of low powered radios used in wireless networks. RF signal intensity is often insufficient with low level and low powered wireless field devices to cover the distances between well pads and overcome the obstacles required to communicate with other wireless field device networks. These well pad locations are typically remote, limiting ready access to convenient sources of electricity. This limits the power of the wireless transceiver that can be installed: without an external supply of electricity, a more powerful transceiver will drain stored energy rapidly and quickly run up replacement and maintenance costs while causing frequent interruptions of network interconnectivity.

One method for interconnecting scattered independent networks is to install a gateway or base station device within each network and link each network through a hardwired backbone or through a separate wireless backbone (e.g., Wi-Fi or a proprietary point-to-point RF network). There are two primary disadvantages to such devices: they are expensive and they are energy intensive devices. Remote locations may not have sufficient power sources available to operate the gateway or base station for long periods without frequent maintenance. There are also additional costs associated with the gateway or base station, which are typically expensive, and require large power sources. Placing cable runs throughout a network scattered over large areas is difficult and can be prohibitively expensive.

To avoid the difficulties of installing a separate communications backbone, network systems may use wireless repeaters to increase range or overcome obstructions. A repeater is a high powered device that functions by transmitting a received low powered signal at much higher power so that the signal will overcome obstructions and distant networks can detect it. Such repeaters require external power sources in order to provide the necessary amplification. Remote locations may not have sufficient power sources available to operate the repeater.

In applications where physical space constraints are a factor, one solution to overcoming an obstruction between two networks is to use a radio transceiver with two antennas. By placing a separate antenna in each area to be interconnected, a single radio transceiver can send and receive signals in both areas. External RF cables connect each of the two antennas to the radio through a powered or passive RF splitter. The use of external RF cables and an RF splitter imposes severe restraints on the length of cable used. For example, LMR-400 low loss RF cable will incur a signal loss of ~0.22 dB/meter at 2.4 GHz and a passive RF splitter reduces the available RF signal strength at each output by half. Practically, this solution can only interconnect two networks, and these networks must be very close to each other before signal loss renders the device useless. Substituting an RF switch for the RF splitter and switching the RF signal between the two antenna's recovers some of the lost signal but adds considerable complexity to the wireless device and still leaves large losses associated with the extra RF antenna cable.

SUMMARY

The present invention bridges a barrier to wireless communication between wireless field device networks using at least a pair of locally-powered wireless devices connected by a wired link spanning the barrier. At least one of the wireless devices in the at least pair is in wireless communication with each of the wireless networks intended to be interconnected. The wireless devices include a wireless transceiver and an antenna. Messages from one wireless field device network addressed to a member node of another wireless field device network are received by a wireless device on one side of the barrier and transmitted via the wired link to another wireless device on the other side of the barrier for routing to the member node of the other wireless field device network.

Another embodiment of the present invention includes a method for bridging a barrier to wireless communication between wireless field device networks. A message from a first wireless field device network addressed to a member node of second wireless field device network is received at a locally-powered wireless device in wireless communication with the first wireless field device network. The message is transmitted through the barrier over a wired link. A locally-powered wireless device in wireless communication with the second wireless field device network receives the message from the wired link and transmits the message into the second wireless field device network for routing to the member node.

DETAILED DESCRIPTION

Figure 1:
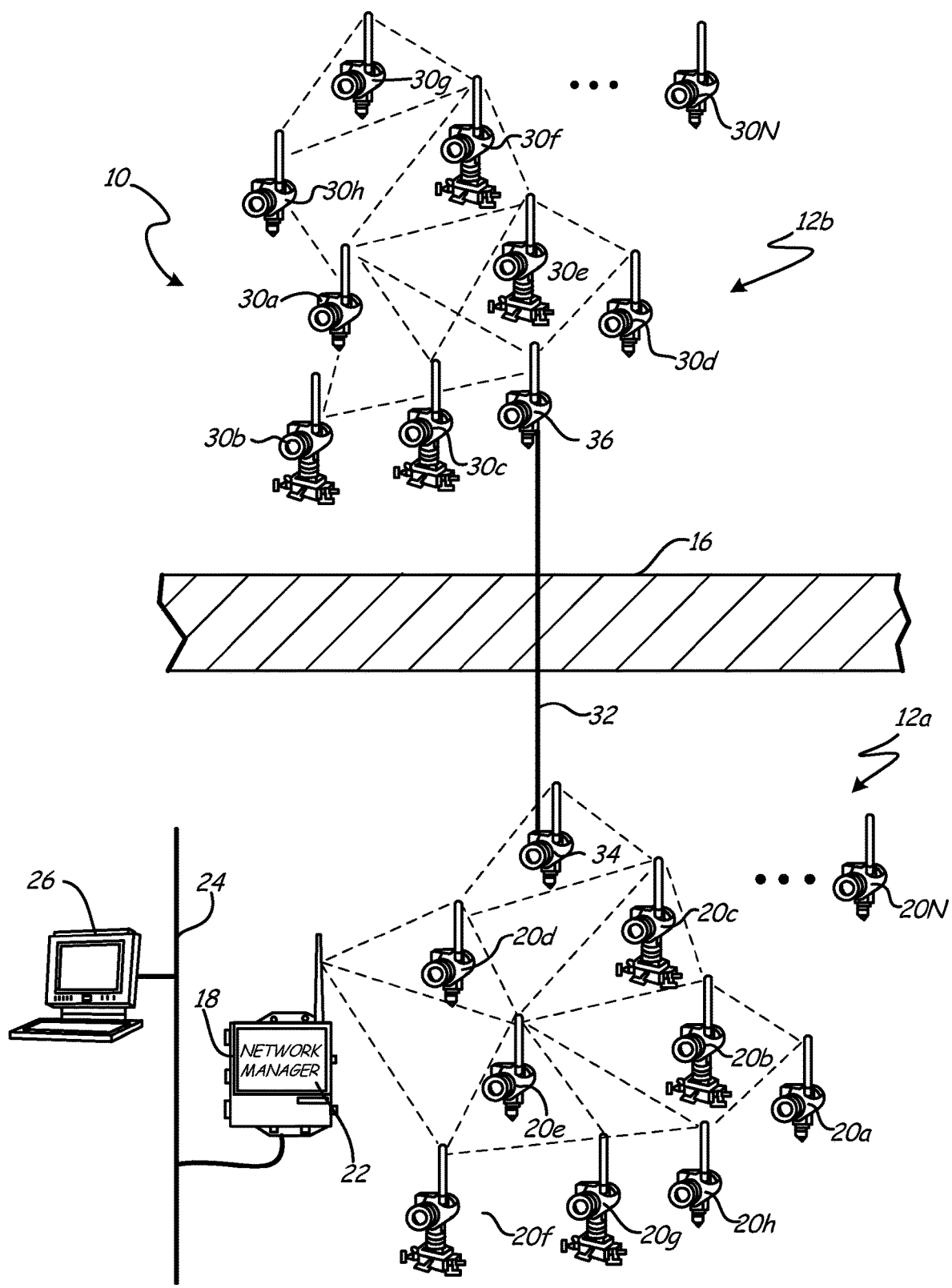
FIG. 1 is a diagram illustrating an implementation of an embodiment of the present invention interconnecting two wireless mesh networks through a barrier using a wired link.

The present invention will be discussed in terms of bridging barriers, whether logical or physical, to communication between wireless field device networks with at least partial mesh network topologies. A person skilled in the art will recognize that the invention is equally suited to other network topologies and is not limited to solely the embodiments described, but that the invention will include all embodiments falling within the scope of the appended claims.

The present invention comprises locally-powered wireless devices associated with each independent wireless field device network to be interconnected and a wired link connecting at least a pair of the wireless devices, the wired link penetrating any barrier to communication. With the present invention, the wireless devices are able to route received messages bi-directionally over the wired link, through the barrier, to other wireless devices associated with other field device networks. Responses to these messages follow a reverse path through the wired link into the originating network. This allows a controller or node in one of the interconnected wireless field device networks to access the nodes of any other interconnected field device network, creating a single unified field device network composed of all the separate parts of the wireless field device network. In a mesh network topology, this allows the unified wireless field device network to use only one Network Manager and one Access Point (or one Gateway) for the entire extended network. Further efficiencies in different embodiments of this invention can be had by using a bus data protocol on the wired link creating a wired data link and connecting several locally-powered wireless devices to the wired data link in an individually addressable, multi-drop, multi-point fashion. Multi-drop is an arrangement with one master or driver device, such as a data router, and multiple slave or receiver devices on a data bus. Multi-point is an arrangement with more than one master or driver device on a data bus. A field device lacking wireless communications capability can be integrated as part of a locally-powered wireless device in the bridging apparatus giving the field device wireless capability and linking it to the rest of the wireless field device network. Alternatively, the field device can be connected to the wired data link in the bridging apparatus, linking it to the rest of the wireless field device network. Further efficiencies can be had by allowing a locally powered field device on the wired link to provide power through the wired link to other devices on the wired link.

Interconnecting otherwise independent wireless field device networks to create a unified field device network increases efficiency by allowing nodes within a wireless network to query remote sensors and other nodes located in separate wireless field device networks directly. This increases the information immediately available throughout the unified field device network, allowing for more accurate and timely responses to changing events. The present invention provides a lower cost, lower loss, and lower power solution than current methods for routing inter-network communications around obstructions. Using a wired data link, instead of the standard method consisting of a single radio with an RF splitter or RF switch and external RF cable linking multiple antennas, reduces signal loss dramatically. By reducing RF loss, the wireless device's power requirements are reduced making a locally-powered apparatus feasible. The present invention is easy to install. The wired link needs be only long enough to span the obstruction, avoiding costly long wiring runs required of an internet backbone or homerun linkages. Because the wireless device is easily programmed to use any standard network protocol, there is ready interoperability with current hardware in existing networks. Using multiple wireless devices also allows the present invention to connect networks which use different network protocols, making it easier to manage, upgrade and expand existing field device networks.

The present invention interconnects wireless field device networks, especially wireless field device mesh networks, by bridging barriers to wireless communication. Every node of a wireless field device mesh network includes a wireless device used to communicate with its neighbors. A wireless device is a wireless transceiver, a wireless data router or a wireless field device. A wireless transceiver comprises a transceiver and an antenna integrated into a single device. A wireless data router comprises a wireless transceiver and a data router integrated into a single device. A wireless field device comprises a wireless data router and a field device integrated into a single device. A wireless transceiver is a device for transmitting and receiving RF-based communication data. A data router is a device that routes data packets received by the wireless transceiver, unpacking the communication payload for consumption by an attached field device (if that device's address matches the final destination address in the packet) or redirecting the communication payload back to the wireless transceiver to be relayed back into the network to the next destination in the logical path. The present invention bridges barriers to wireless communication by connecting a wired link between a plurality of locally-powered wireless devices associated with otherwise different field device networks and using the wired link to exchange messages between the locally-powered wireless devices in the different field device networks.

FIG. 1 illustrates an implementation of an embodiment of the present invention interconnecting two wireless mesh networks through a barrier using a wired link. FIG. 1 shows unified wireless field device mesh network 10, which is formed by wireless field device mesh networks 12a and 12b that are separated by barrier 16 to wireless communication. Barrier 16 may be a physical barrier, such as walls, ceilings, and floors of a building; trees, brush, or other vegetation; buildings, and other man-made obstacles such as tanks, towers, and vessels; steep terrain, such as cliffs, hills, and valleys or underground structures, such as mines, caves, tunnels, or sewers; or a barrier due to use of different radios or different communications protocols. Barrier 16 may also be in the form of a protocol incompatibility between networks 12a and 12b. Network 12a includes gateway 18, meshed cloud of nodes 20a-20h . . . 20N, and Network Manager 22. Nodes 20a-20N interface with gateway 18, which provides access to the plant network 24 and host computer 26, and controls the communications cycle of network 12a. Network Manager 22 is a software program located aboard gateway 18 that processes information from the nodes of network 12a, generating wireless links, control messages, communications schedules and data queries to suit the situation. Alternatively, Network Manager 22 can be located on a computer remotely connected to gateway 18, for example, host computer 26 or a computer connected to plant network 24.

Network 12b is composed of a meshed cloud of wireless nodes 30a-30h . . . 30N. The nodes of network 12b are prevented from wirelessly communicating with the nodes of network 12a by barrier 16. As illustrated in FIG. 1, network 12b does not have a gateway by which it can interface directly with plant network 24. Instead, it relies on communication with gateway 18 of network 12a for access to plant network 24. In other embodiments, network 12b may have its own gateway or wireless access point connected to plant network 24 as well, but only one Network Manager is required for the joined networks 12a and 12b.

In order to integrate wireless field device mesh networks 12a and 12b into single wireless field device mesh network 10, wired link 32 is run between locally-powered wireless devices 34 and 36 and overcomes barrier 16. Wired link 32 is of any suitable type, for example, EIA/RS-485, Ethernet, or even a proprietary type. This arrangement allows wireless device 34 to transmit messages from network 12a over wired link 32 to wireless device 36 and into network 12b and allows wireless device 36 to transmit messages from network 12b over wired link 32 to wireless device 34 and into network 12a. For example, if host computer 26 requires information contained on node 30c, a message from host computer 26 is routed by gateway 18 into network 12a, where the message is relayed from node to node until it reaches wireless device 34. Wireless device 34 determines that the message is destined for node 30c within network 12b, and sends the message over wired link 32 to wireless device 36. The message is then transmitted into network 12b and is relayed to the destination node 30c. The response to the message follows the reverse path back to gateway 18 and host computer 26. If barrier 16 to wireless communication includes non-physical obstacles, such as different frequency bands or protocols, wireless devices 34 and 36 are able to convert the message into a common format for transmission over wired link 32 and reconvert the message into a format suitable for transmittal into networks 12a and 12b respectively. In addition, wireless devices 34 and 36 route standard wireless messages within their respective networks, 12a and 12b respectively, using standard 'store and forward' routing mechanisms associated with wireless networks. Functionally the two separate networks 12a and 12b become unified wireless field device mesh network 10 where each node can communicate with host computer 26 through gateway 18.

FIGS. 2A-2D are diagrams showing embodiments of the present invention employing two locally-powered wireless devices including one wireless transceiver and one wireless device comprising a data router to control both the local transceiver and the remote wireless transceiver to interconnect two wireless mesh networks through a barrier using an external wired link between them.

Figure 2A:
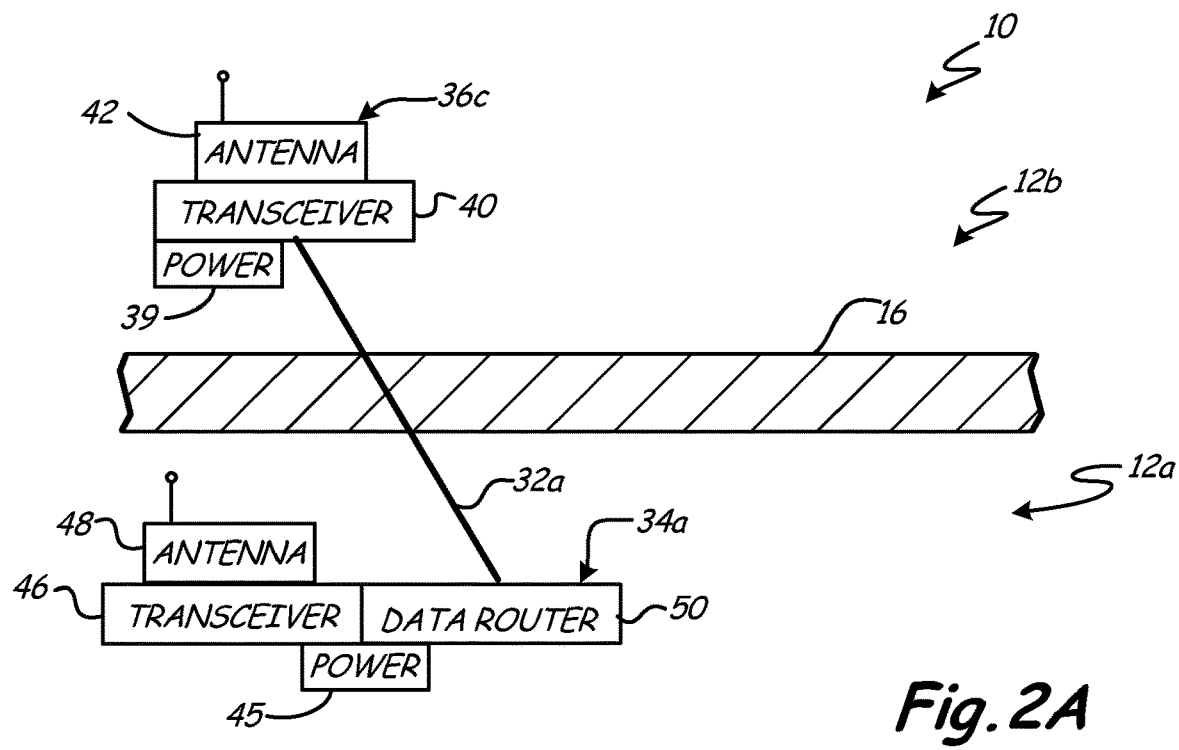
FIGS. 2A-2D are diagrams showing embodiments of the present invention employing two locally-powered wireless devices including one wireless transceiver and one wireless device comprising a data router to control both the local transceiver and the remote wireless transceiver to interconnect two wireless mesh networks through a barrier using an external wired link between them.

FIG. 2A is a block diagram of one embodiment of the bridging apparatus shown in FIG. 1 employing a single wireless data router to control a remote wireless transceiver to interconnect two wireless mesh networks through a barrier using an external wired link between them. Unified wireless field device mesh network 10 is formed by wireless field device mesh networks 12a and 12b that are separated by barrier 16 to wireless communication. Wireless device 36c is a locally-powered wireless transceiver comprising local power source 39, transceiver 40, and antenna 42 integrated into a single package. Wireless device 34a is a locally-powered wireless data router comprising local power source 45, transceiver 46, antenna 48, and data router 50 integrated into a single package. Wired link 32a overcomes the barrier to communication 16 and connects wireless device 34a and wireless device 36c by connecting data router 50 to transceiver 40. Wired link 32a is of any suitable type, for example, EIA/RS-485, Ethernet, or even a proprietary type. Wired link 32a employs a suitable communication protocol, for example, HDLC, Modbus®, HART®, Profibus®, Foundation Fieldbus®, TCP/IP, or DeviceNet®. Communication between transceiver 46 and data router 50 employs a suitable local communication bus, for example, UART, CAN, or SPI® and communication protocol, for example, HDLC, Modbus®, HART®, Profibus®, Foundation Fieldbus®, TCP/IP, or DeviceNet®. Data router 50 controls both local transceiver 40 and remote transceiver 46.

Local power sources 39 and 45 comprise at least one of self-contained electrochemical sources (e.g., long-life batteries or fuel cells) and low-power energy-scavenging power sources (e.g., vibration, solar, or thermoelectric). The local power sources 39 and 45 are integrated into their attached wireless devices, as shown. Alternatively, such local power sources are physically separate, but electrically connected to provide power to an attached wireless device. For example, a vibration generator attached to a nearby vibration source or a thermoelectric generator attached to a nearby heat source, such as a hot pipe, is electrically connected to a wireless device to supply power. In addition, low-power energy-scavenging power sources further comprise energy storage devices (e.g., rechargeable batteries or storage capacitors) when necessary to maintain power. For example, a solar power source requires an energy storage device, such as a rechargeable battery, to supply power at night.

In operation, a message for a node in network 12b is relayed through network 12a until it reaches wireless device 34a. Transceiver 46, through antenna 48, receives the message and passes it to data router 50. Data router 50 checks the address field of the message and formats the message for transmission by wireless transceiver 36c in communication with network 12b. Data router 50 sends the formatted message to transceiver 40 on the other side of barrier 16 via wired link 32a. Transceiver 40, through antenna 42, then broadcasts the message into network 12b to be relayed to the destination node. A return message follows the reverse path back. Data router 50 reformats messages received from either transceiver 40 or 46 into a format suitable for broadcasting by the other transceiver 46 or 40 to allow the apparatus to bridge a barrier in differing network protocols. Functionally the two separate networks 12a and 12b become unified wireless field device mesh network 10.

Figure 2B:
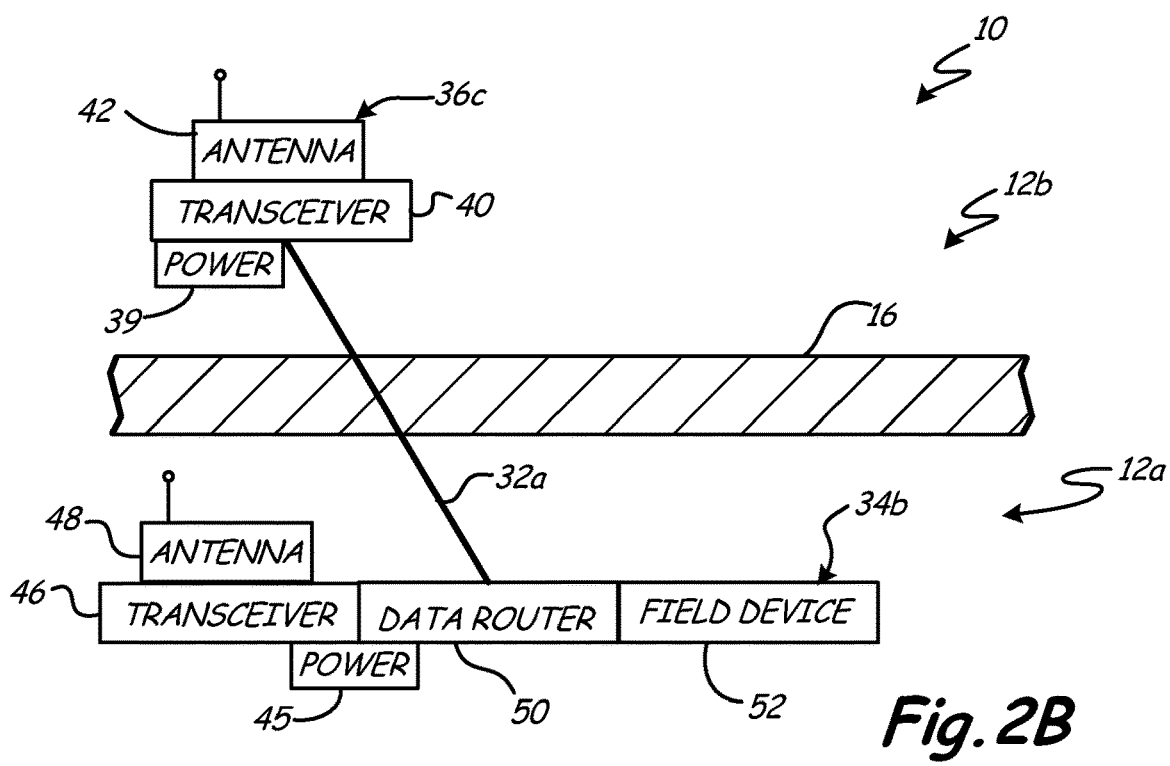

FIG. 2B is a block diagram of another embodiment of the bridging apparatus shown in FIG. 1 employing a single wireless field device to control a remote wireless transceiver to interconnect two wireless mesh networks through a barrier using an external wired link between them. As compared to the embodiment of FIG. 2A, wireless data router 34a is replaced by wireless field device 34b. All identically numbered components are as described above. Wireless device 34b is a locally-powered wireless field device comprising local power source 45, transceiver 46, antenna 48, data router 50, and field device 52 integrated into a single package. Wired link 32a overcomes the barrier to communication 16 and connects wireless device 34b and wireless device 36c. Communication between field device 52 and data router 50 employs a suitable local communication bus, for example, UART, CAN, or SPI®.

In operation, a message for a node in network 12b is relayed through network 12a until it reaches wireless device 34b. Transceiver 46, through antenna 48, receives the message and passes it to data router 50. Data router 50 checks the address field of the message, either unpacking it for field device 52 or formatting the message for transmission by wireless transceiver 36c in communication with network 12b. Data router 50 sends the formatted message to transceiver 40 on the other side of barrier 16 via wired link 32a. Wireless transceiver 40, through antenna 42, then broadcasts the message into network 12b to be relayed to the destination node. A return message follows the reverse path back. Functionally the two separate networks 12a and 12b become unified wireless field device mesh network 10.

Figure 2C:
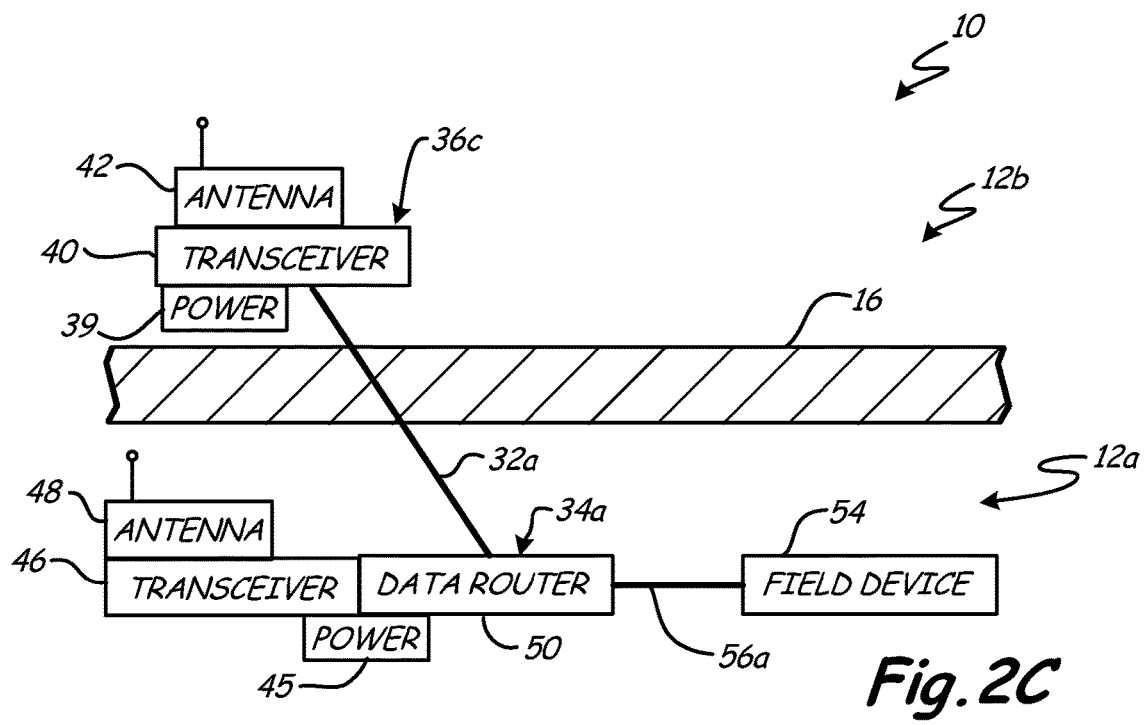

FIG. 2C is a block diagram of another embodiment of the bridging apparatus shown in FIG. 1 employing a single wireless data router to control a remote wireless transceiver to interconnect two wireless mesh networks through a barrier using an external wired link between them. This embodiment is identical to that shown in FIG. 2A, except for the addition of electrically connected, but physically separate, field device 54. All identically numbered components are as described above. Field device 54 is connected to data router 50 of wireless device 34a by wired link 56a. Wired link 56a is of any suitable type, for example, EIA/RS-485, Ethernet, or even a proprietary type. Communication between field device 54 and wireless device 34a employs a suitable communication protocol, for example, HDLC, Modbus®, HART®, Profibus®, Foundation Fieldbus®, TCP/IP, or DeviceNet®. Power for field device 54 is either provided locally or remotely or by wireless device 34a through wired link 56a.

Operation is as described for the embodiment shown in FIG. 2A, except that when data router 50 checks the address field of the message, it either formats it for transmission to field device 54 over wired link 56a or formats the message for transmission by wireless transceiver 36c in communication with network 12b. Should the message be for field device 54, data router 50 sends the formatted message to field device 54 via wired link 56a. Field device 54, with no wireless capability of its own, is connected through wireless device 34a to unified wireless field device mesh network 10.

Figure 2D:
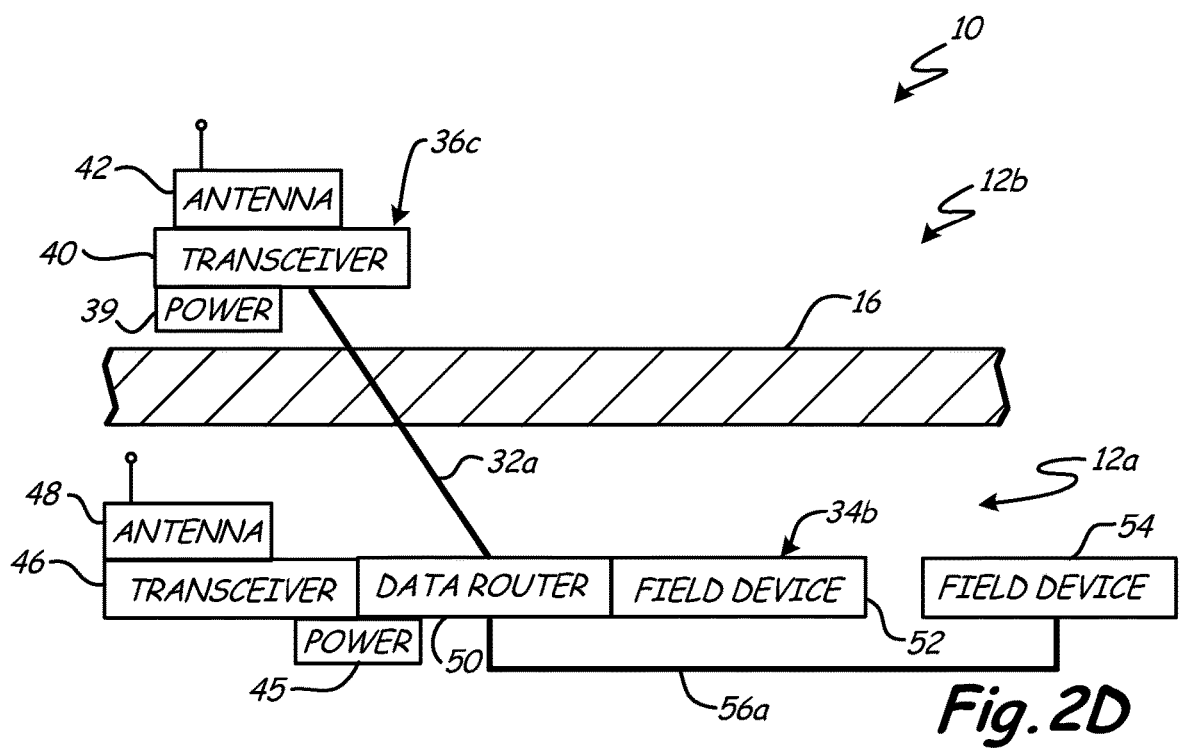

FIG. 2D is a block diagram of another embodiment of the bridging apparatus shown in FIG. 1 employing a single wireless field device to control a remote wireless transceiver to interconnect two wireless mesh networks through a barrier using an external wired link between them. This embodiment combines those shown in FIGS. 2B and 2C. Operation is as described for FIGS. 2B and 2C.

While the embodiments illustrated in FIGS. 2A-2D show two local power sources, it is understood that the invention requires only one local power source for the bridging apparatus. For example, in FIG. 2A, wireless transceiver 36c may not be powered by its own power source 39 but powered by wireless device 34a over wired data link 32a. In such a case, both wireless devices 36c and 34a are locally-powered by power source 45.

Figure 3A:
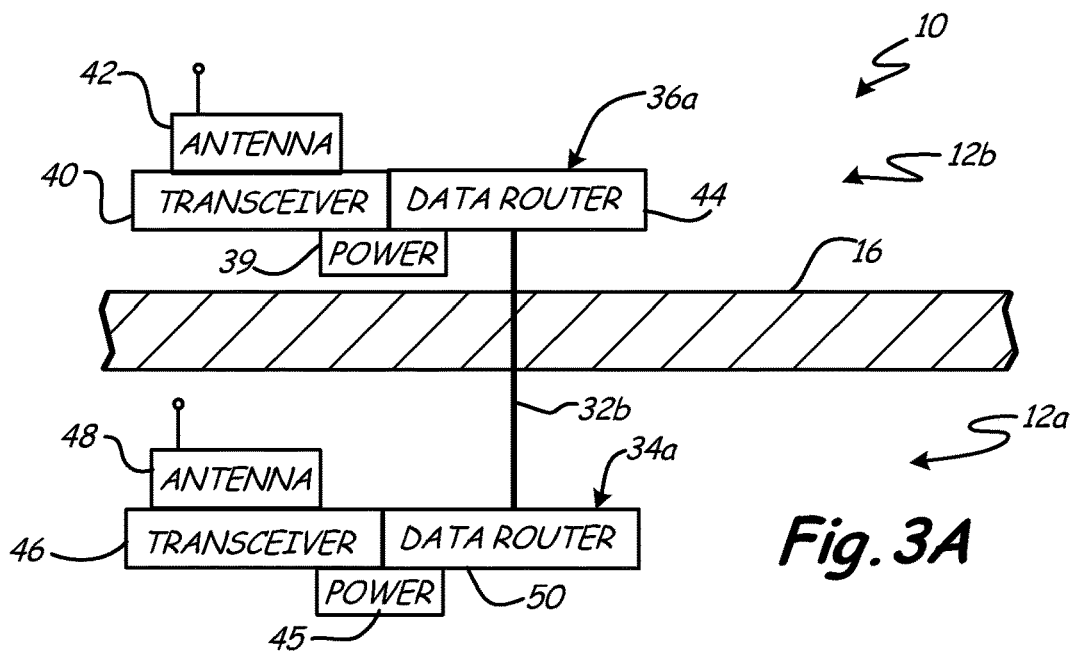
FIGS. 3A-3C are diagrams showing embodiments of the present invention employing two locally-powered wireless data routers, each placed in a different wireless mesh network, sharing a wired link between them to interconnect the wireless mesh networks through a barrier using a wired link.
Figure 3B:
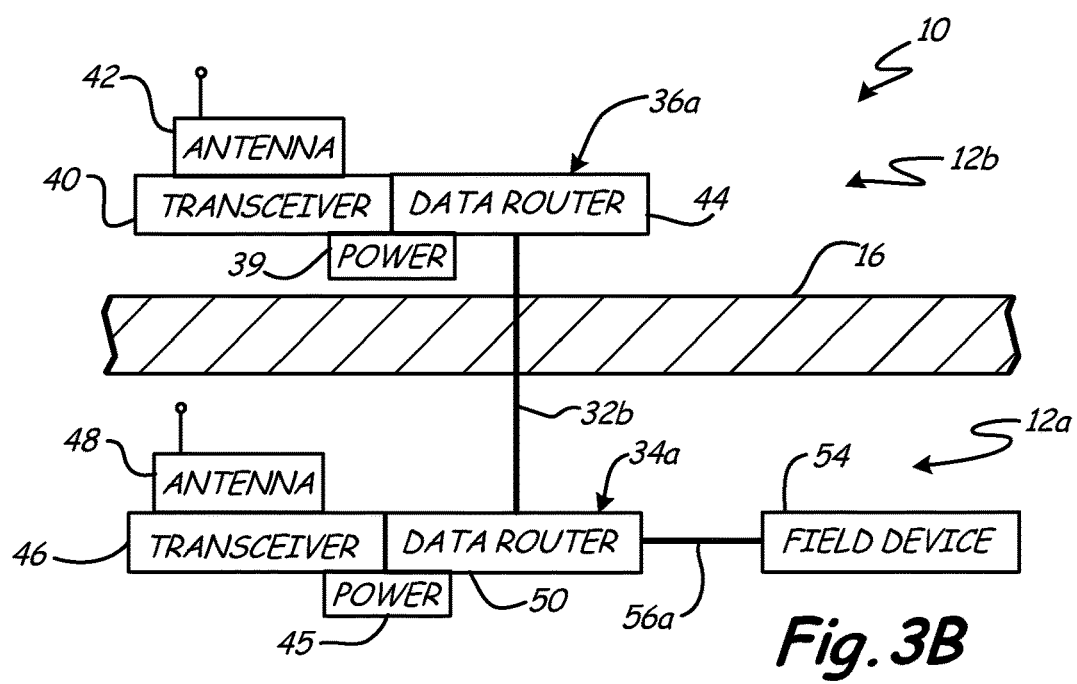
Figure 3C:
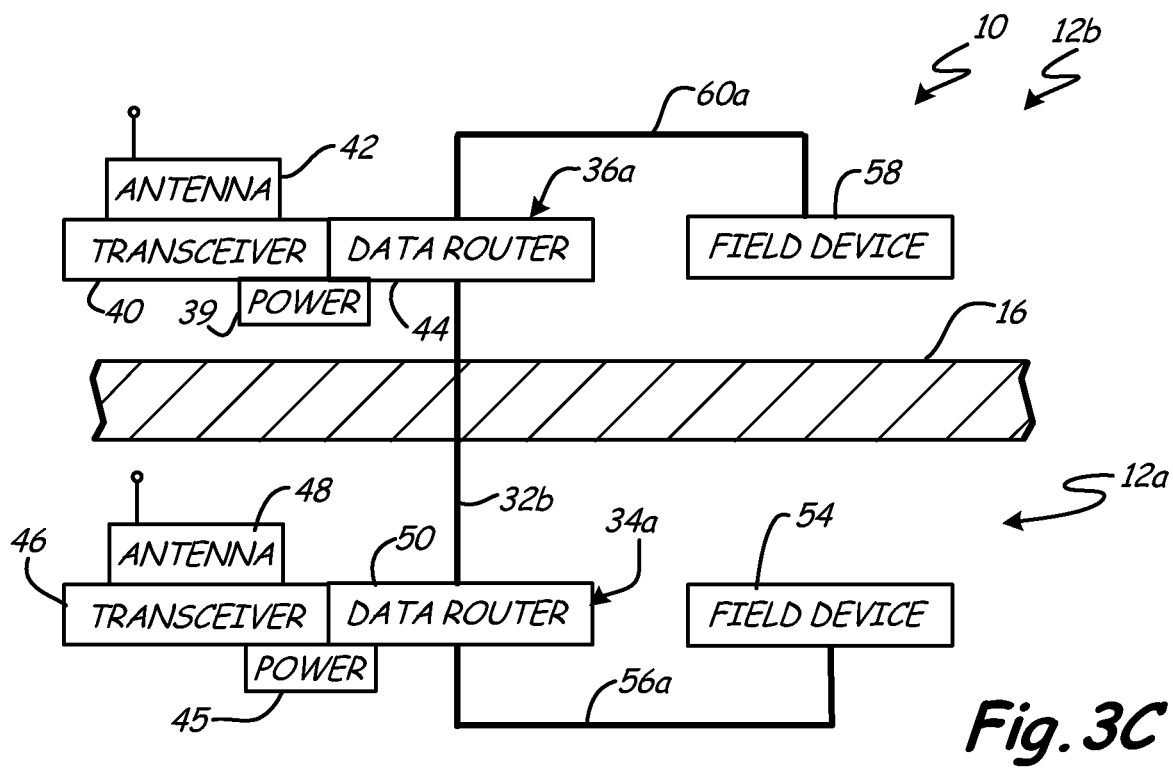

FIGS. 3A-3C are diagrams showing embodiments of the present invention employing two locally-powered wireless data routers, each placed in a different wireless mesh network, sharing a wired link between them to interconnect the wireless mesh networks through a barrier using a wired link.

FIG. 3A is a block diagram of one embodiment of the bridging apparatus shown in FIG. 1 employing two wireless data routers to interconnect two wireless mesh networks through a barrier using an external wired link between them. All identically numbered components are as described above. Unified wireless field device mesh network 10 is formed by wireless field device mesh networks 12a and 12b that are separated by barrier 16 to wireless communication.

Wireless device 36a is a locally-powered wireless data router comprising local power source 39, transceiver 40, antenna 42, and data router 44 integrated into a single package. Wireless device 34a is a locally-powered wireless data router comprising local power source 45, transceiver 46, antenna 48, and data router 50 integrated into a single package. Wired link 32b overcomes the barrier to communication 16 and connects wireless device 34a and wireless device 36a by connecting data router 50 to data router 44. Wired link 32b is of any suitable type, for example, EIA/RS-485, Ethernet, or even a proprietary type. Wired link 32b employs a suitable communication protocol, for example, HDLC, Modbus®, HART®, Profibus®, Foundation Fieldbus®, TCP/IP, or DeviceNet®. Communication between transceiver 40 and data router 44 employs a suitable local communication bus, for example, UART, CAN, or SPI®.

In operation, a message for a node in network 12b is relayed through network 12a until it reaches wireless device 34a. Transceiver 46, through antenna 48, receives the message and passes it to data router 50. Data router 50 checks the address field of the message and formats the message for transmission over wired link 32b to wireless device 36a in communication with network 12b. Data router 50 sends the formatted message to data router 44 on the other side of barrier 16 via wired link 32b. Data router 44 checks the address field of the message and reformats the message for transmission by transceiver 40 in communication with network 12b. Transceiver 40, through antenna 42, then broadcasts the message into network 12b to be relayed to the destination node. A return message follows the reverse path back. Functionally the two separate networks 12a and 12b become unified wireless field device mesh network 10.

FIG. 3B is a block diagram of another embodiment of the bridging apparatus shown in FIG. 1 employing two wireless data routers to interconnect two wireless mesh networks through a barrier using an external wired link between them. This embodiment is identical to that shown in FIG. 3A, except for the addition of field device 54. All identically numbered components are as described above. Field device 54 is connected to data router 50 of wireless device 34a by wired link 56a. Power for field device 54 is either provided locally or remotely or by wireless device 34a through wired link 56a.

Operation is as described for the embodiment shown in FIG. 3A, except that when data router 50 checks the address field of the message, it either formats it for transmission to field device 54 over wired link 56a or formats the message for transmission by wireless device 36a in communication with network 12b. Should the message be for field device 54, data router 50 sends the formatted message to field device 54 via wired link 56a. Field device 54, with no wireless capability of its own, is connected through wireless device 34a to unified wireless field device mesh network 10.

FIG. 3C is a block diagram of another embodiment of the bridging apparatus shown in FIG. 1 employing two wireless data routers to interconnect two wireless mesh networks through a barrier using an external wired link between them. This embodiment is identical to that shown in FIG. 3B, except for the addition of field device 58. All identically numbered components are as described above. Field device 58 is connected to data router 44 of wireless device 36a by wired link 60a. Wired link 60a is of any suitable type, for example, EIA/RS-485, Ethernet, or even a proprietary type. Communication between field device 58 and wireless device 36a employs a suitable communication protocol, for example, HDLC, Modbus®, HART®, Profibus®, Foundation Fieldbus®, TCP/IP, or DeviceNet®. Power for field device 58 is either provided locally or remotely or by wireless device 36a through wired link 60

Operation is as described for the embodiment shown in FIG. 3B, except that when data router 44 checks the address field of the message, it either formats it for transmission to field device 58 over wired link 60a or formats the message for transmission by transceiver 40 in communication with network 12b. Transceiver 40, through antenna 42, then broadcasts the message into network 12b to be relayed to the destination node. A return message follows the reverse path back. Functionally the two separate networks 12a and 12b become unified wireless field device mesh network 10. Should the message be for field device 58, data router 44 sends the formatted message to field device 58 via wired link 60a. Field device 58, with no wireless capability of its own, is connected through wireless device 36a to unified wireless field device mesh network 10.

While the embodiments illustrated in FIGS. 3A-3C show two local power sources, it is understood that the invention requires only one local power source for the bridging apparatus. For example, in FIG. 3A, wireless transceiver 36a may not be powered by its own power source 39 but powered by wireless device 34a over wired data link 32b. In such a case, both wireless devices 36a and 34a are locally-powered by power source 45.

Figure 4A:
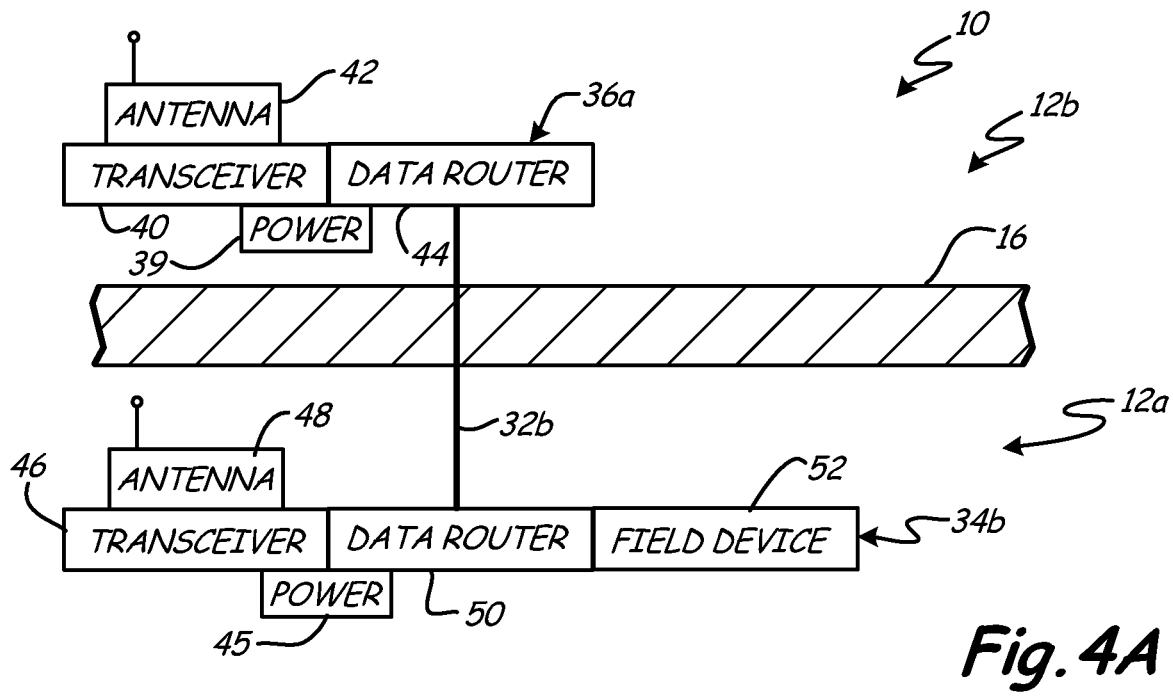
FIGS. 4A-4H are diagrams showing embodiments of the present invention employing two locally-powered wireless devices including one wireless field device and one wireless data router, each placed in different wireless mesh networks, to interconnect the wireless mesh networks through a barrier using a wired link

FIGS. 4A-4H are diagrams showing embodiments of the present invention employing two locally-powered wireless devices including one wireless field device and one wireless data router, each placed in different wireless mesh networks, to interconnect the wireless mesh networks through a barrier using a wired link FIG. 4A is a block diagram of one embodiment of the bridging apparatus shown in FIG. 1 employing one wireless field device and one wireless data router to interconnect two wireless mesh networks through a barrier using an external wired link between them. All identically numbered components are as described above. Unified wireless field device mesh network 10 is formed by wireless field device mesh networks 12a and 12b that are separated by barrier 16 to wireless communication. Wireless device 36a is a locally-powered wireless data router comprising local power source 39, transceiver 40, antenna 42, and data router 44 integrated into a single package. Wireless device 34b is a locally-powered wireless field device comprising local power source 45, transceiver 46, antenna 48, data router 50, and field device 52 integrated into a single package. Wired link 32b overcomes the barrier to communication 16 and connects wireless device 34b and wireless device 36a by connecting data router 50 to data router 44.

In operation, a message for a node in network 12b is relayed through network 12a until it reaches wireless device 34b. Transceiver 46, through antenna 48, receives the message and passes it to data router 50. Data router 50 checks the address field of the message and it either unpacks it for field device 52 or formats the message for transmission over wired link 32b to wireless device 36a in communication with network 12b. Data router 50 sends the formatted message to data router 44 on the other side of barrier 16 via wired link 32b. Data router 44 checks the address field of the message and reformats the message for transmission by transceiver 40 in communication with network 12b. Transceiver 40, through antenna 42, then broadcasts the message into network 12b to be relayed to the destination node. A return message follows the reverse path back. Functionally the two separate networks 12a and 12b become unified wireless field device mesh network 10.

Figure 4B:
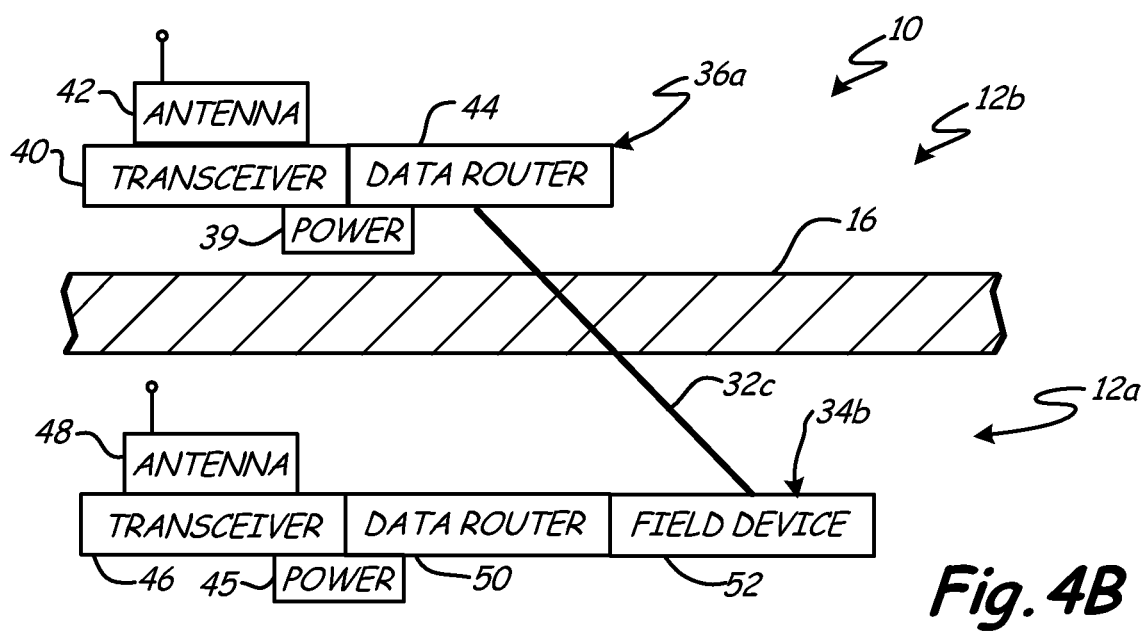

FIG. 4B is a block diagram of another embodiment of the bridging apparatus shown in FIG. 1 employing one wireless field device and one wireless data router to interconnect two wireless mesh networks through a barrier using an external wired link between them. This embodiment is identical to that shown in FIG. 4A, except wired link 32c overcomes the barrier to communication 16 and connects wireless device 34b and wireless device 36a by connecting field device 52 to data router 44. All identically numbered components are as described above. Field device 52 comprises communication circuitry for sending and receiving wired signals. Wired link 32c is of any suitable type, for example, EIA/RS-485, Ethernet, or even a proprietary type. Wired link 32c employs a suitable communication protocol, for example, HDLC, Modbus®, HART®, Profibus®, Foundation Fieldbus®, TCP/IP, or DeviceNet®. Communication between field device 52 and data router 50 employs a suitable local communication bus, for example, UART, CAN, or SPI®.

In operation, a message for a node in network 12b is relayed through network 12a until it reaches wireless device 34b. Transceiver 46, through antenna 48, receives the message and passes it to data router 50. Data router 50 checks the address field of the message and it either unpacks it for field device 52 or formats the message for transmission over wired link 32c to wireless device 36a in communication with network 12b. In this embodiment, data router 50 sends the formatted message to field device 52, and field device 52 sends the message to data router 44 of wireless device 36a on the other side of barrier 16 via wired link 32c. Data router 44 checks the address field of the message and reformats the message for transmission by transceiver 40 in communication with network 12b. Transceiver 40, through antenna 42, then broadcasts the message into network 12b to be relayed to the destination node. A return message follows the reverse path back. Functionally the two separate networks 12a and 12b become unified wireless field device mesh network 10.

Figure 4C:
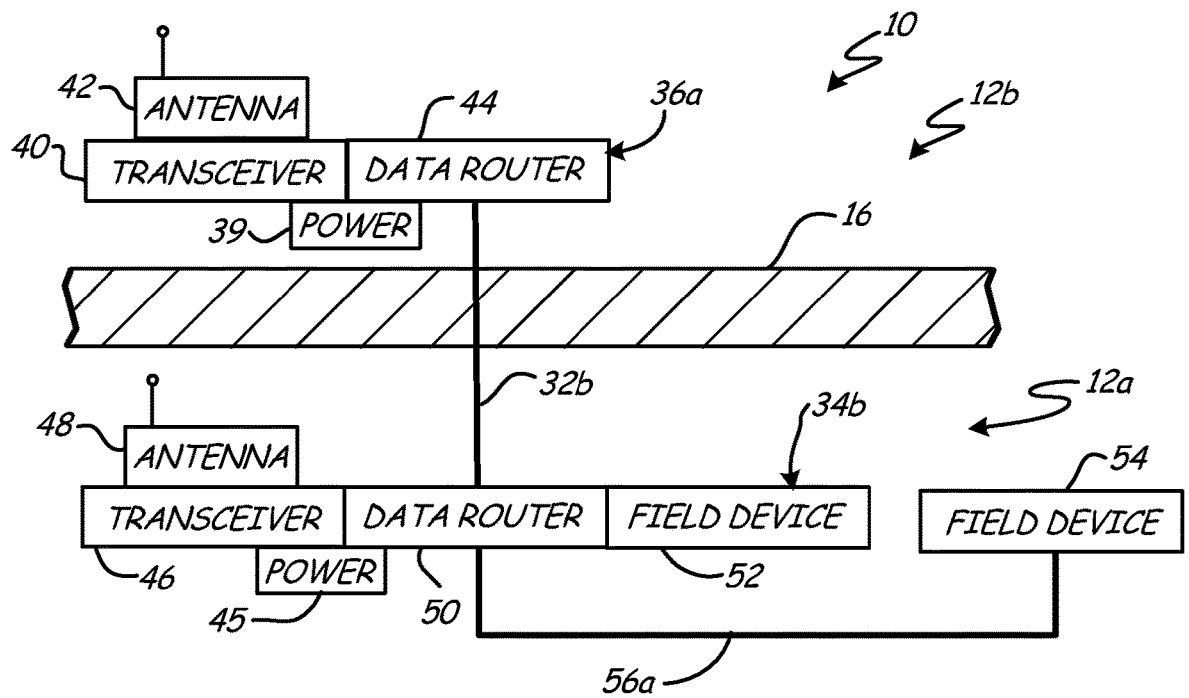

FIG. 4C is a block diagram of another embodiment of the bridging apparatus shown in FIG. 1 employing one wireless field device and one wireless data router to interconnect two wireless mesh networks through a barrier using an external wired link between them. This embodiment is identical to that shown in FIG. 4A, except for the addition of field device 54. All identically numbered components are as described above. Field device 54 is connected to data router 50 of wireless device 34a by wired link 56a. Power for field device 54 is either provided locally or remotely or by wireless device 34b through wired link 56a.

Operation is as described for the embodiment shown in FIG. 4A, except that when data router 50 checks the address field of the message, it either unpacks it for field device 52, formats it for transmission to field device 54 over wired link 56a, or formats the message for transmission by wireless device 36a in communication with network 12b. Should the message be for field device 54, data router 50 sends the formatted message to field device 54 via wired link 56a. Field device 54, with no wireless capability of its own, is connected through wireless device 34b to unified wireless field device mesh network 10.

Figure 4D:
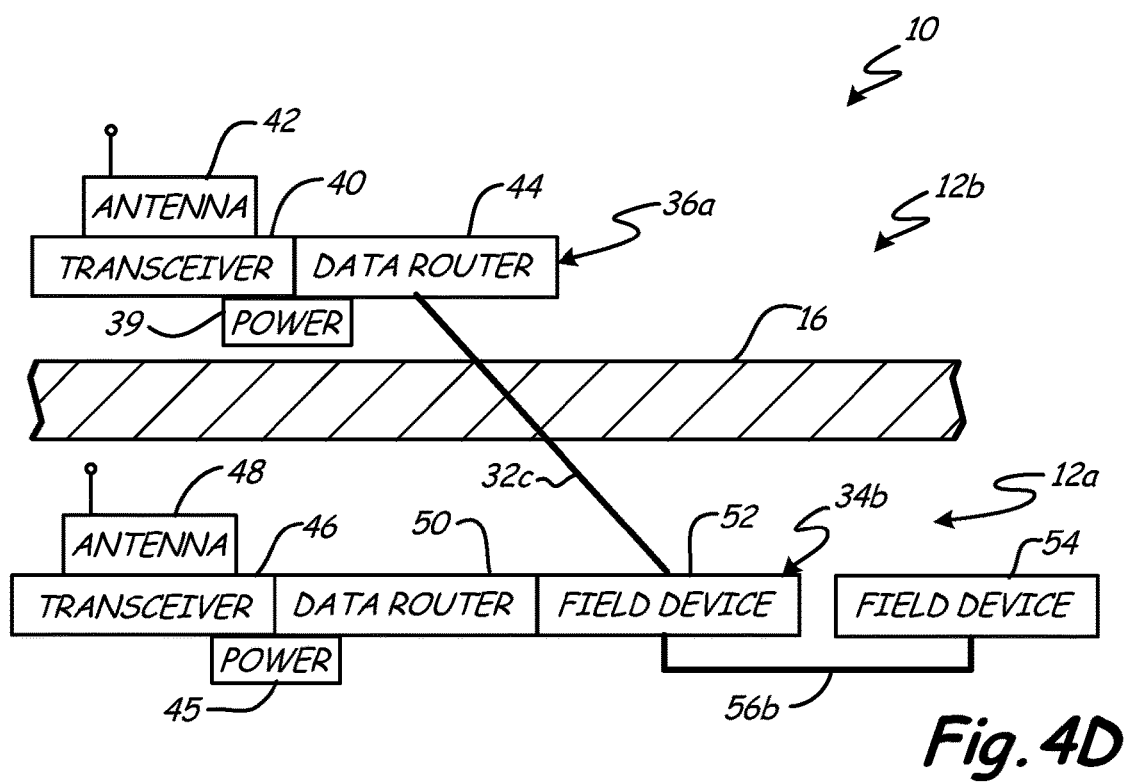

FIG. 4D is a block diagram of another embodiment of the bridging apparatus shown in FIG. 1 employing one wireless field device and one wireless data router to interconnect two wireless mesh networks through a barrier using an external wired link between them. This embodiment is identical to that shown in FIG. 4C, except wired link 32c and wired link 56b connect to field device 52. All identically numbered components are as described above. Wired link 56b is of any suitable type, for example, EIA/RS-485, Ethernet, or even a proprietary type. Wired link 56b employ a suitable communication protocol, for example, HDLC, Modbus®, HART®, Profibus®, Foundation Fieldbus®, TCP/IP, or DeviceNet®. Power for field device 54 is either provided locally or remotely or by wireless device 34b through wired link 56b.

In operation, a message for a node in network 12b is relayed through network 12a until it reaches wireless device 34b. Transceiver 46, through antenna 48, receives the message and passes it to data router 50. Data router 50 checks the address field of the message and it either unpacks it for field device 52, formats it for transmission to field device 54 over wired link 56b, or formats the message for transmission by wireless device 36a in communication with network 12b. In this embodiment, data router 50 sends the formatted message for network 12b to field device 52, and field device 52 sends the message to data router 44 of wireless device 36a on the other side of barrier 16 via wired link 32c. Data router 44 checks the address field of the message and reformats the message for transmission by transceiver 40 in communication with network 12b. Transceiver 40, through antenna 42, then broadcasts the message into network 12b to be relayed to the destination node. A return message follows the reverse path back. Functionally the two separate networks 12a and 12b become unified wireless field device mesh network 10. Should the message be for field device 54, data router 50 sends the formatted message for field device 54 to field device 52, and field device 52 sends the message to field device 54 via wired link 56b. Field device 54, with no wireless capability of its own, is connected through wireless device 34b to unified wireless field device mesh network 10.

Figure 4E:
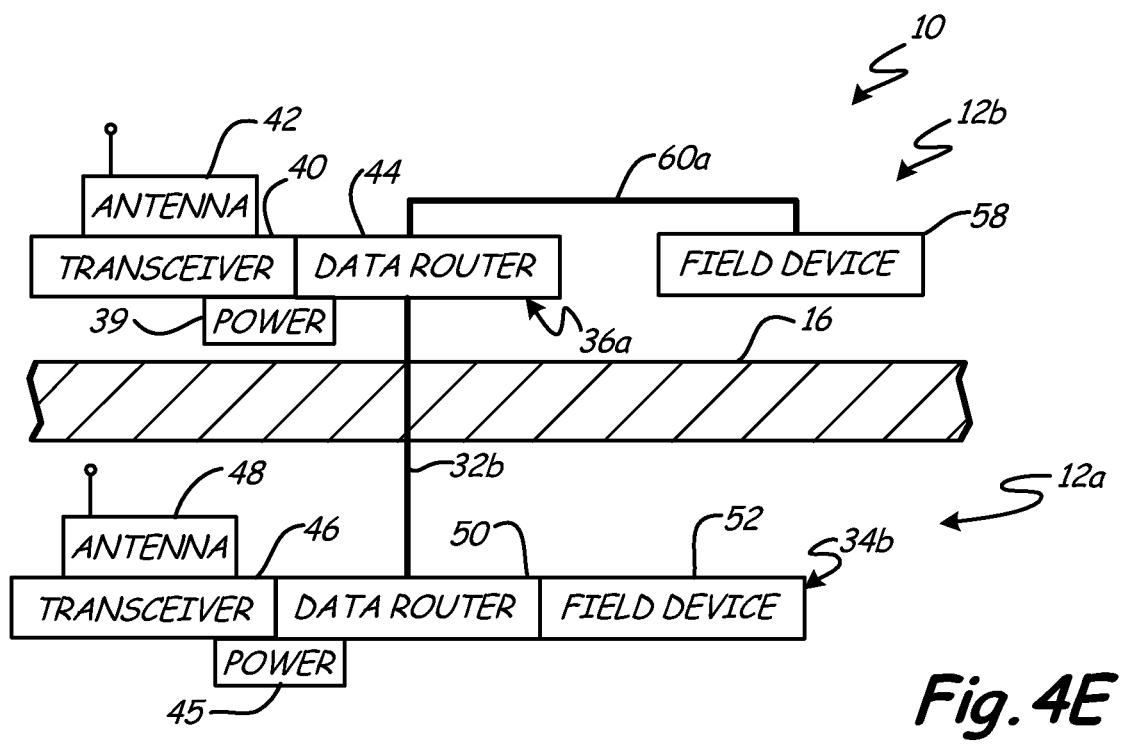

FIG. 4E is a block diagram of another embodiment of the bridging apparatus shown in FIG. 1 employing one wireless field device and one wireless data router to interconnect two wireless mesh networks through a barrier using an external wired link between them. This embodiment is identical to that shown in FIG. 4A, except for the addition of field device 58. All identically numbered components are as described above. Field device 58 is connected to data router 44 of wireless device 36a by wired link 60a. Power for field device 58 is either provided locally or remotely or by wireless device 36a through wired link 60a.

Operation is as described for the embodiment shown in FIG. 4A, except that when data router 44 checks the address field of the message, it either formats it for transmission to field device 58 over wired link 60a or formats the message for transmission by transceiver 40 in communication with network 12b. Transceiver 40, through antenna 42, then broadcasts the message into network 12b to be relayed to the destination node. A return message follows the reverse path back. Should the message be for field device 58, data router 44 sends the formatted message to field device 58 via wired link 60a. Field device 58, with no wireless capability of its own, is connected through wireless device 36a to unified wireless field device mesh network 10.

Figure 4F:
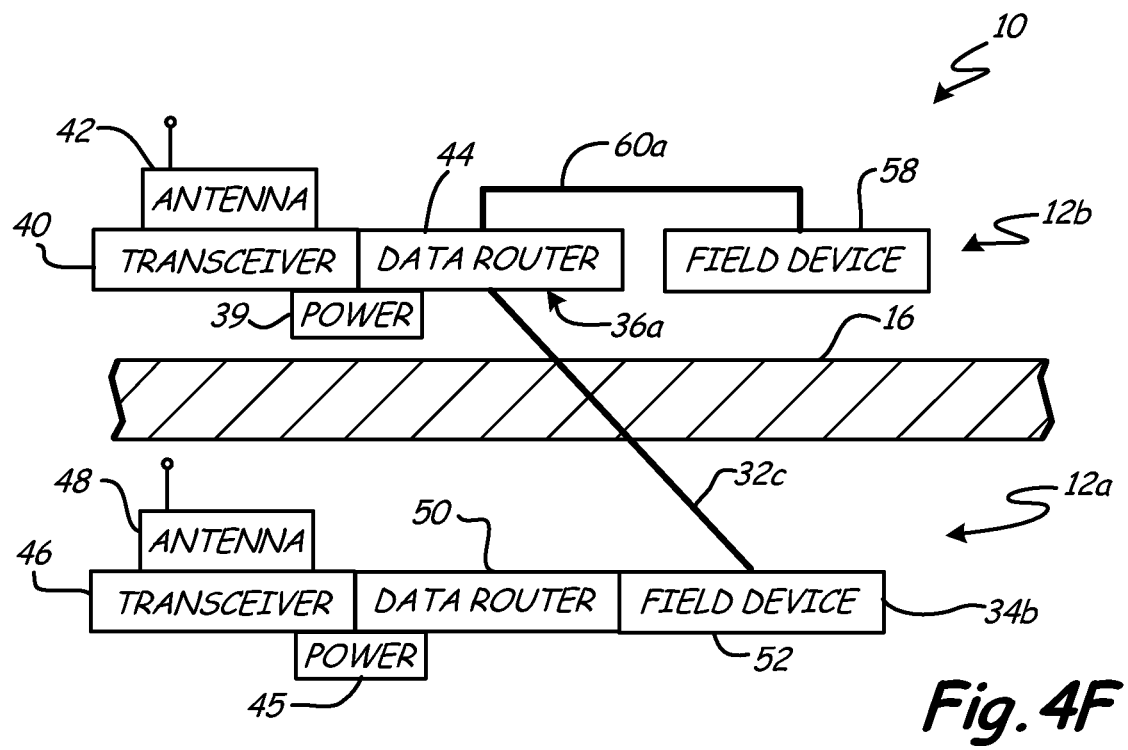

FIG. 4F is a block diagram of another embodiment of the bridging apparatus shown in FIG. 1 employing one wireless field device and one wireless data router to interconnect two wireless mesh networks through a barrier using an external wired link between them. This embodiment is identical to that shown in FIG. 4E, except wired link 32c overcomes the barrier to communication 16 and connects wireless device 34b and wireless device 36a by connecting field device 52 to data router 44.

Operation is as described for the embodiment shown in FIG. 4E, except in this embodiment, data router 50 sends the formatted message to field device 52, and field device 52 sends the message to data router 44 of wireless device 36a on the other side of barrier 16 via wired link 32c. Functionally the two separate networks 12a and 12b become unified wireless field device mesh network 10.

Figure 4G:
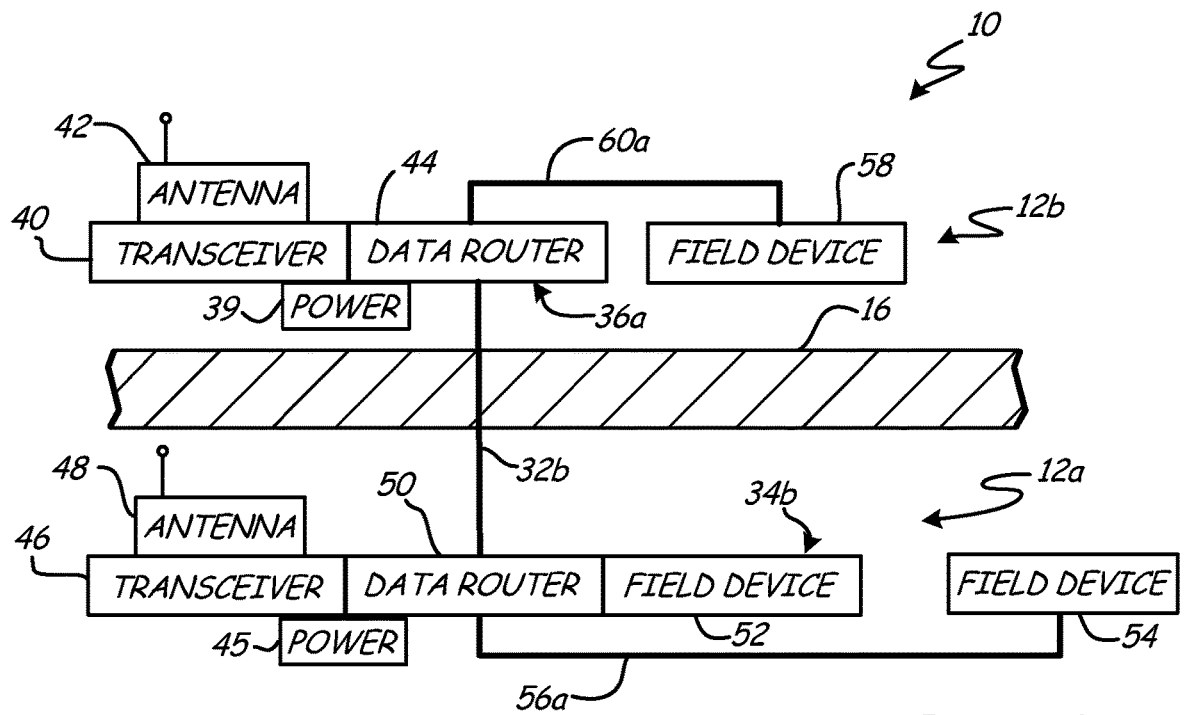

FIG. 4G is a block diagram of another embodiment of the bridging apparatus shown in FIG. 1 employing one wireless field device and one wireless data router to interconnect two wireless mesh networks through a barrier using an external wired link between them. This embodiment combines those shown in FIGS. 4C and 4E. Operation is as described for the embodiments shown in FIGS. 4C and 4E.

Figure 4H:
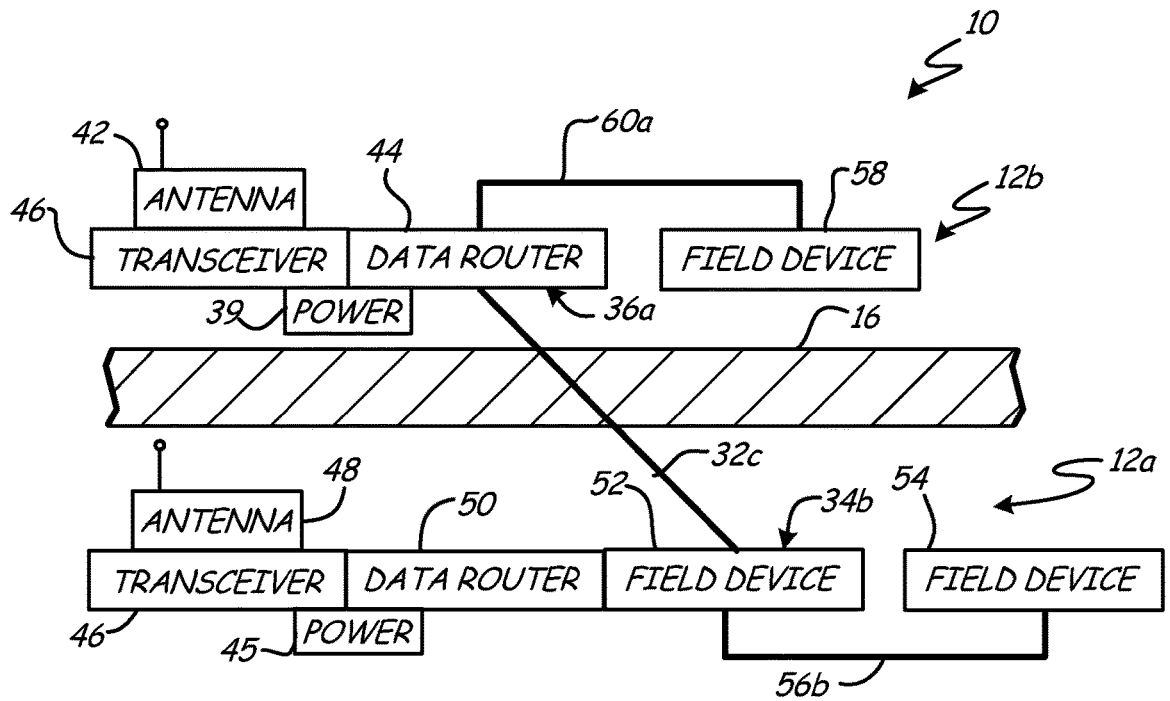

FIG. 4H is a block diagram of another embodiment of the bridging apparatus shown in FIG. 1 employing one wireless field device and one wireless data router to interconnect two wireless mesh networks through a barrier using an external wired link between them. This embodiment combines those shown in FIGS. 4D and 4F. Operation is as described for the embodiments shown in FIGS. 4D and 4F.

While the embodiments illustrated in FIGS. 4A-4H show two local power sources, it is understood that the invention requires only one local power source for the bridging apparatus. For example, in FIG. 4A, wireless transceiver 36a may not be powered by its own power source 39 but powered by wireless device 34b over wired data link 32b. In such a case, both wireless devices 36a and 34b are locally-powered by power source 45.

FIGS. 5A-5J are diagrams showing embodiments of the present invention employing two locally-powered wireless field devices, each placed in different wireless mesh networks, sharing a wired link between them to interconnect the wireless mesh networks through a barrier using a wired link.

Figure 5A:
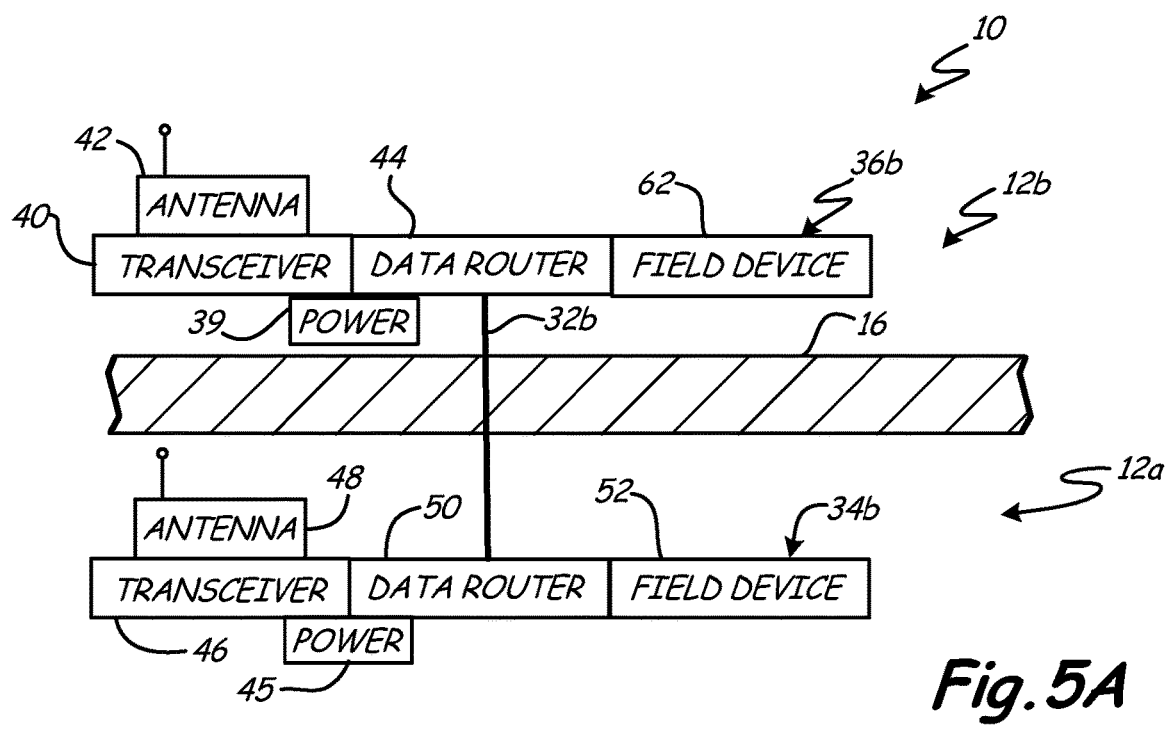
FIGS. 5A-5J are diagrams showing embodiments of the present invention employing two locally-powered wireless field devices, each placed in different wireless mesh networks, sharing a wired link between them to interconnect the wireless mesh networks through a barrier using a wired link.

FIG. 5A is a block diagram of one embodiment of the bridging apparatus shown in FIG. 1 employing two wireless field devices to interconnect two wireless mesh networks through a barrier using an external wired link between them. Unified wireless field device mesh network 10 is formed by wireless field device mesh networks 12a and 12b that are separated by barrier 16 to wireless communication. Wireless device 36b is a locally-powered wireless field device comprising local power source 39, transceiver 40, antenna 42, data router 44, and field device 62 integrated into a single package. Wireless device 34b is a locally-powered wireless field device comprising local power source 45, transceiver 46, antenna 48, data router 50, and field device 52 integrated into a single package. Wired link 32b overcomes the barrier to communication 16 and connects wireless device 34b and wireless device 36b by connecting data router 50 to data router 44. Communication between field device 62 and data router 44 employs a suitable local communication bus, for example, UART, CAN, or SPI®.

In operation, a message for a node in network 12b is relayed through network 12a until it reaches wireless device 34b. Transceiver 46, through antenna 48, receives the message and passes it to data router 50. Data router 50 checks the address field of the message and either unpacks it for field device 52 or formats the message for transmission over wired link 32b to wireless device 36b in communication with network 12b. Data router 50 sends the formatted message to data router 44 on the other side of barrier 16 via wired link 32b. Data router 44 checks the address field of the message and either unpacks it for field device 62 or reformats the message for transmission by transceiver 40 in communication with network 12b. Transceiver 40, through antenna 42, then broadcasts the message into network 12b to be relayed to the destination node. A return message follows the reverse path back. Functionally the two separate networks 12a and 12b become unified wireless field device mesh network 10.

Figure 5B:
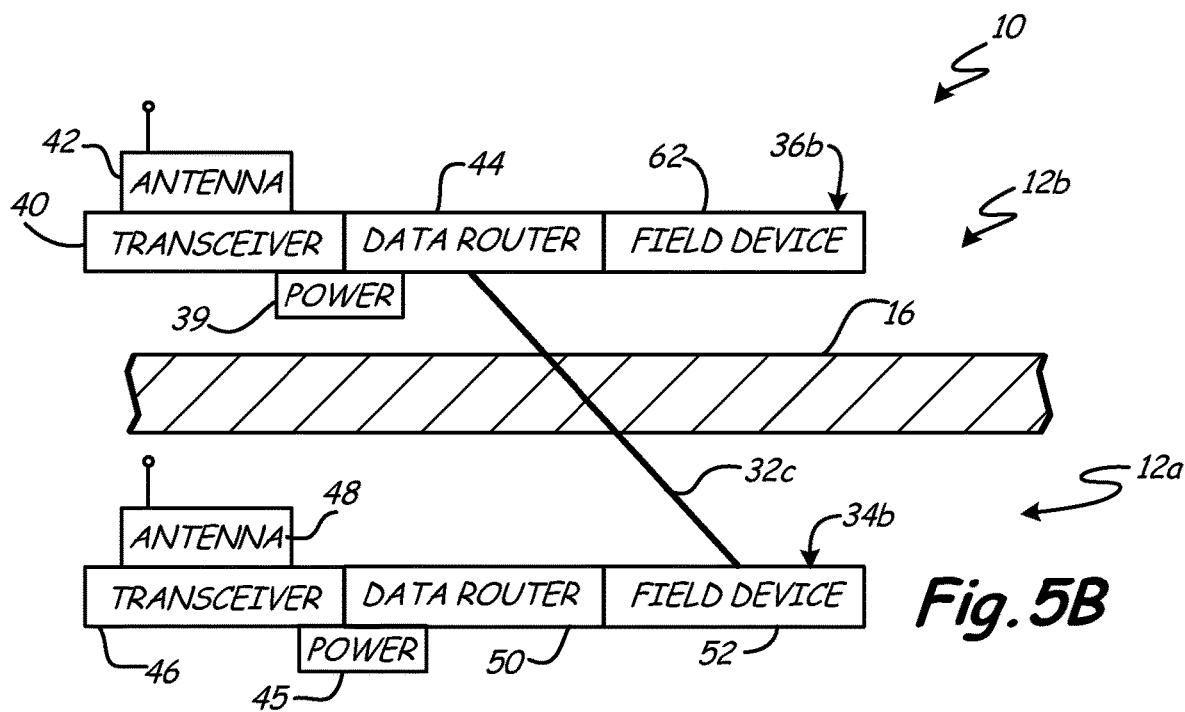

FIG. 5B is a block diagram of another embodiment of the bridging apparatus shown in FIG. 1 employing two wireless field devices to interconnect two wireless mesh networks through a barrier using an external wired link between them. This embodiment is identical to that shown in FIG. 5A, except wired link 32c overcomes the barrier to communication 16 and connects wireless device 34b and wireless device 36b by connecting field device 52 to data router 44. All identically numbered components are as described above.

In operation, a message for a node in network 12b is relayed through network 12a until it reaches wireless device 34b. Transceiver 46, through antenna 48, receives the message and passes it to data router 50. Data router 50 checks the address field of the message and it either unpacks it for field device 52 or formats the message for transmission over wired link 32c to wireless device 36b in communication with network 12b. In this embodiment, data router 50 sends the formatted message to field device 52, and field device 52 sends the message to data router 44 of wireless device 36b on the other side of barrier 16 via wired link 32c. Data router 44 checks the address field of the message and either unpacks it for field device 62 or reformats the message for transmission by transceiver 40 in communication with network 12b. Transceiver 40, through antenna 42, then broadcasts the message into network 12b to be relayed to the destination node. A return message follows the reverse path back. Functionally the two separate networks 12a and 12b become unified wireless field device mesh network 10.

Figure 5C:
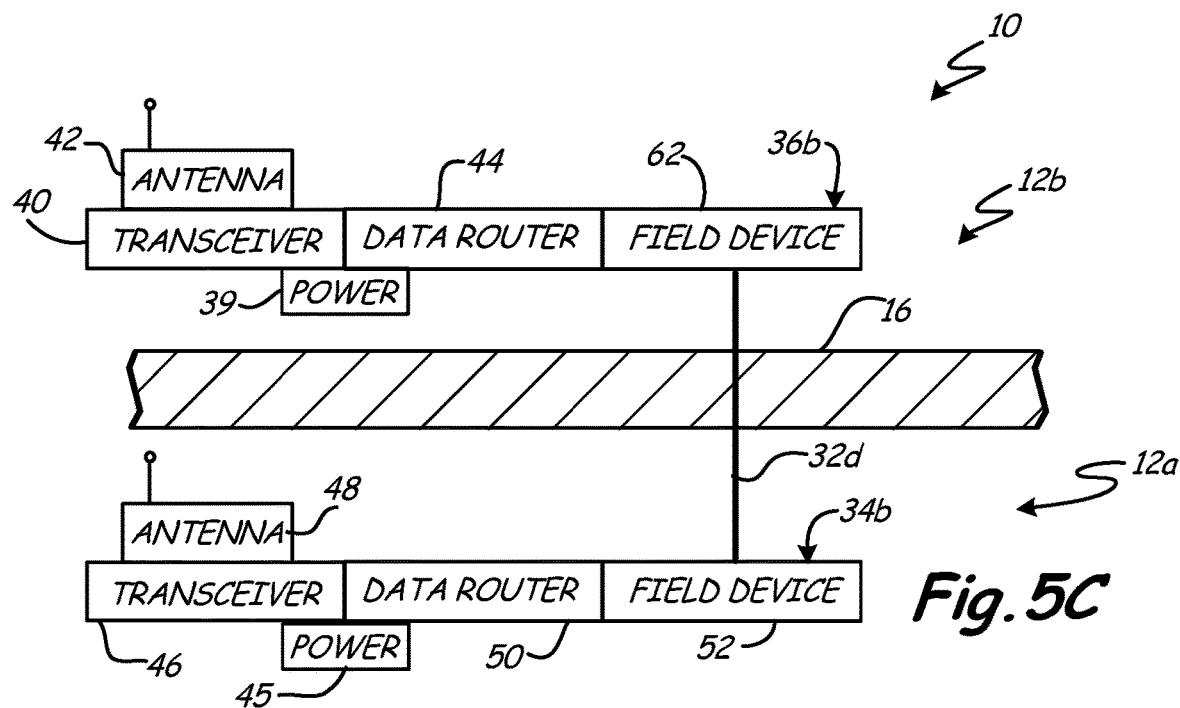

FIG. 5C is a block diagram of another embodiment of the bridging apparatus shown in FIG. 1 employing two wireless field devices to interconnect two wireless mesh networks through a barrier using an external wired link between them. This embodiment is identical to that shown in FIG. 5A, except wired link 32d overcomes the barrier to communication 16 and connects wireless device 34b and wireless device 36b by connecting field device 52 to field device 62. All identically numbered components are as described above. Field device 52 and field device 62 each comprise communication circuitry for sending and receiving wired signals. Wired link 32d is of any suitable type, for example, EIA/RS-485, Ethernet, or even a proprietary type. Wired link 32d employs a suitable communication protocol, for example, HDLC, Modbus®, HART®, Profibus®, Foundation Fieldbus®, TCP/IP, or DeviceNet®.

In operation, a message for a node in network 12b is relayed through network 12a until it reaches wireless device 34b. Transceiver 46, through antenna 48, receives the message and passes it to data router 50. Data router 50 checks the address field of the message and it either unpacks it for field device 52 or formats the message for transmission over wired link 32d to wireless device 36b in communication with network 12b. In this embodiment, data router 50 sends the formatted message to field device 52, and field device 52 sends the message to field device 62 of wireless device 36b on the other side of barrier 16 via wired link 32d. Field device 62 passes the message to data router 44. Data router 44 checks the address field of the message and either unpacks it for field device 62 or reformats the message for transmission by transceiver 40 in communication with network 12b. Transceiver 40, through antenna 42, then broadcasts the message into network 12b to be relayed to the destination node. A return message follows the reverse path back. Functionally the two separate networks 12a and 12b become unified wireless field device mesh network 10.

Figure 5D:
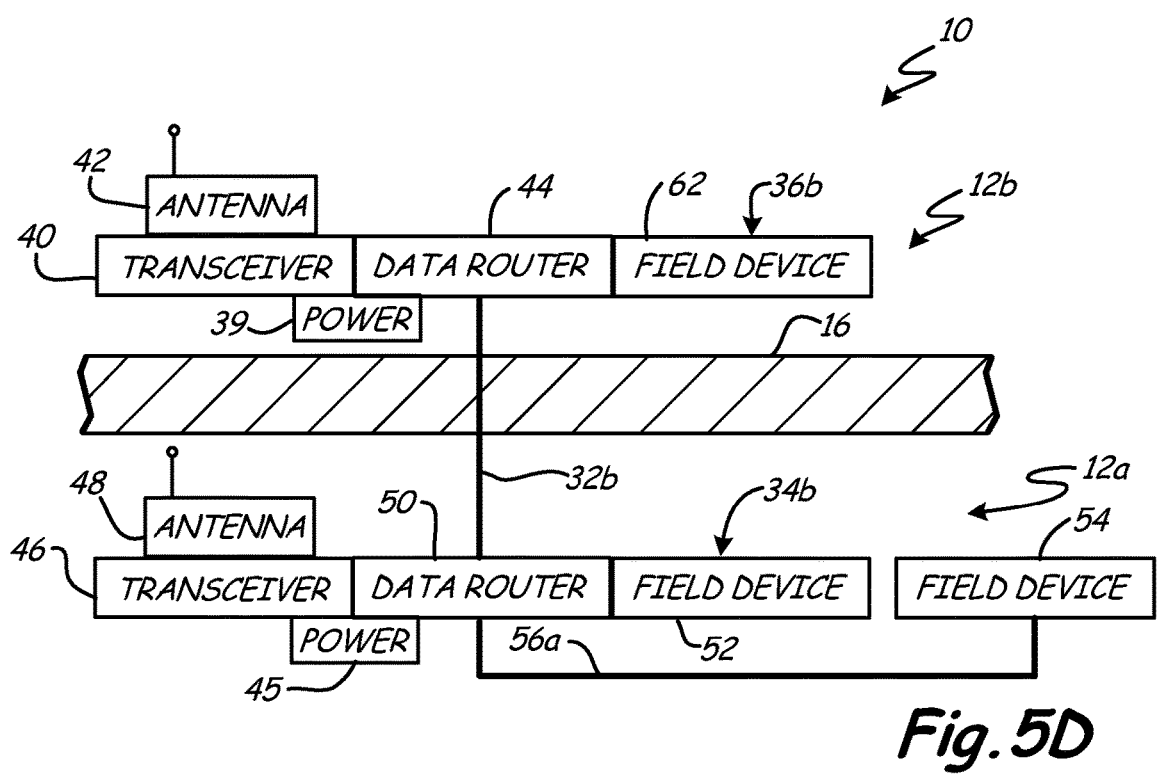

FIG. 5D is a block diagram of another embodiment of the bridging apparatus shown in FIG. 1 employing two wireless field devices to interconnect two wireless mesh networks through a barrier using an external wired link between them. This embodiment is identical to that shown in FIG. 5A, except for the addition of field device 54. All identically numbered components are as described above. Field device 54 is connected to data router 50 of wireless device 34b by wired link 56a. Power for field device 54 is either provided locally or remotely or by wireless device 34b through wired link 56a.

Operation is as described for the embodiment shown in FIG. 5A, except that when data router 50 checks the address field of the message, it either unpacks it for field device 52, formats it for transmission to field device 54 over wired link 56a, or formats the message for transmission by wireless device 36b in communication with network 12b. Should the message be for field device 54, data router 50 sends the formatted message to field device 54 via wired link 56a. Field device 54, with no wireless capability of its own, is connected through wireless device 34b to unified wireless field device mesh network 10.

Figure 5E:
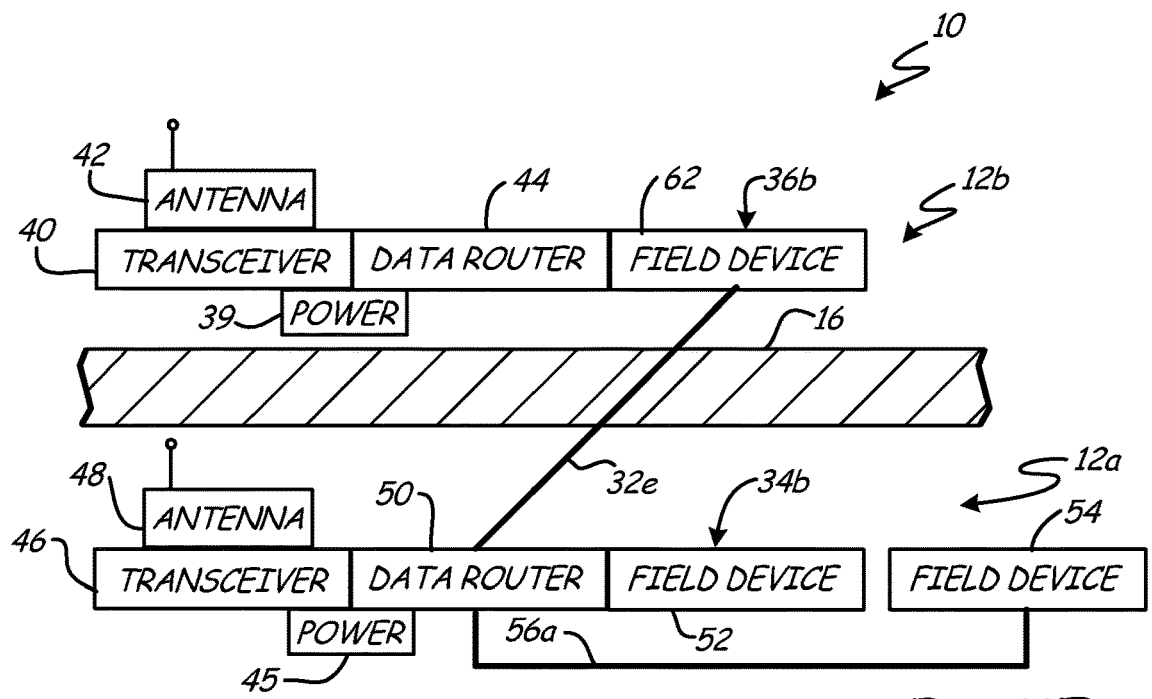

FIG. 5E is a block diagram of another embodiment of the bridging apparatus shown in FIG. 1 employing two wireless field devices to interconnect two wireless mesh networks through a barrier using an external wired link between them. This embodiment is identical to that shown in FIG. 5D, except wired link 32e overcomes the barrier to communication 16 and connects wireless device 34b and wireless device 36b by connecting data router 50 to field device 62. All identically numbered components are as described above. Wired link 32e is of any suitable type, for example, EIA/RS-485, Ethernet, or even a proprietary type. Wired link 32e employs a suitable communication protocol, for example, HDLC, Modbus®, HART®, Profibus®, Foundation Fieldbus®, TCP/IP, or DeviceNet®.

Operation is as described for the embodiment shown in FIG. 5D, except that in this embodiment data router 50 sends the formatted message to field device 62 of wireless device 36b on the other side of barrier 16 via wired link 32e. Field device 62 passes the message to data router 44. Data router 44 checks the address field of the message and either unpacks it for field device 62 or reformats the message for transmission by transceiver 40 in communication with network 12b. Transceiver 40, through antenna 42, then broadcasts the message into network 12b to be relayed to the destination node. A return message follows the reverse path back. Functionally the two separate networks 12a and 12b become unified wireless field device mesh network 10.

Figure 5F:
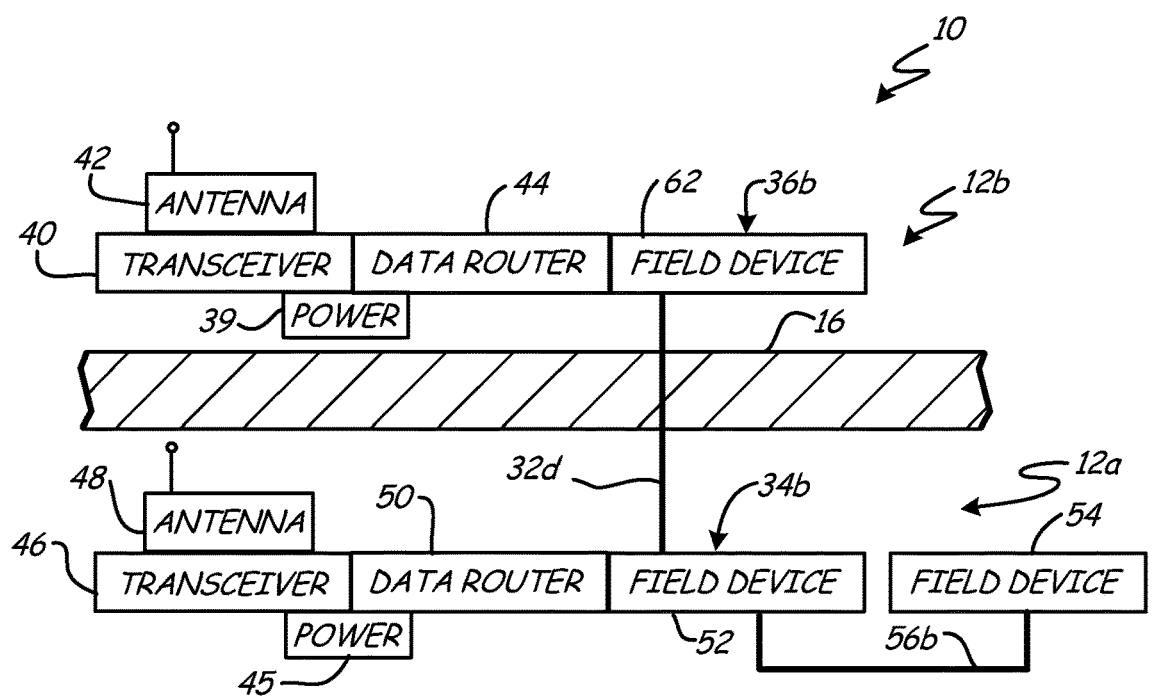

FIG. 5F is a block diagram of another embodiment of the bridging apparatus shown in FIG. 1 employing two wireless field devices to interconnect two wireless mesh networks through a barrier using an external wired link between them. This embodiment is identical to that shown in FIG. 5E, except wired link 32d and wired link 56b connect to field device 52. All identically numbered components are as described above. Power for field device 54 is either provided locally or remotely or by wireless device 34b through wired link 56b.

Operation is as described for the embodiment shown in FIG. 5E, except that in this embodiment data router 50 sends the formatted message for network 12b to field device 52, and field device 52 sends the message to field device 62 of wireless device 36b on the other side of barrier 16 via wired link 32d. Should the message be for field device 54, data router 50 sends the formatted message for field device 54 to field device 52, and field device 52 sends the message to field device 54 via wired link 56*b*. Field device 54, with no wireless capability of its own, is connected through wireless device 34*b* to unified wireless field device mesh network 10.

Figure 5G:
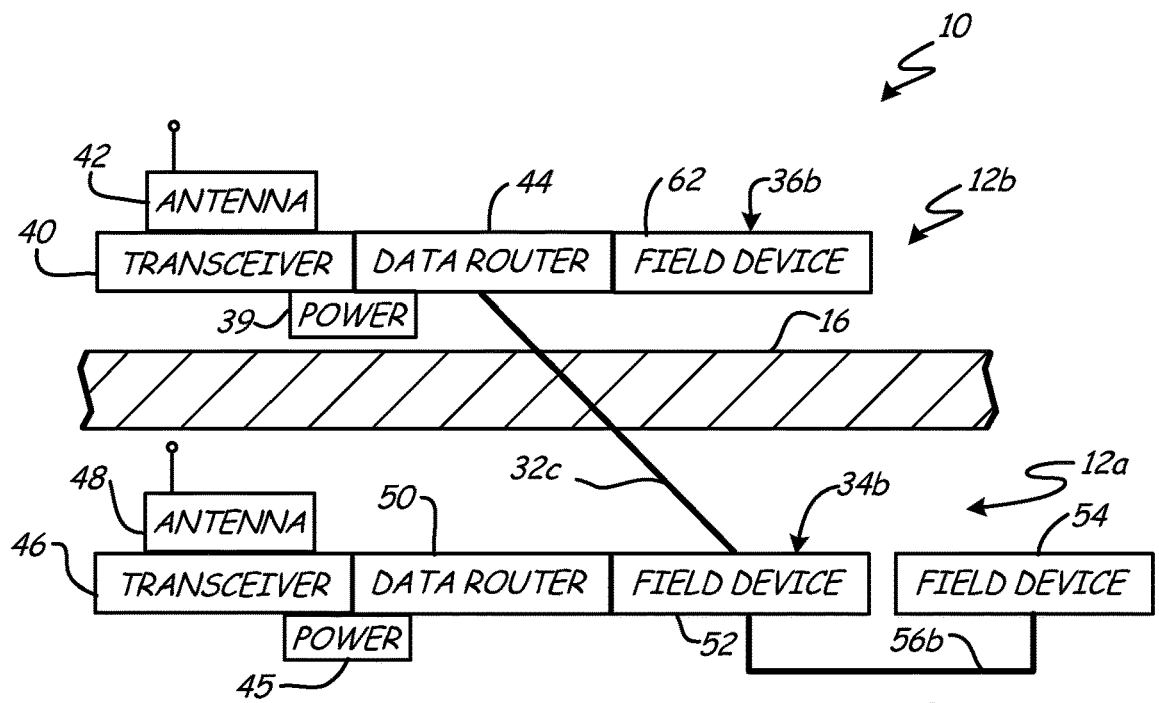

FIG. 5G is a block diagram of another embodiment of the bridging apparatus shown in FIG. 1 employing two wireless field devices to interconnect two wireless mesh networks through a barrier using an external wired link between them. This embodiment is identical to that shown in FIG. 5F, except wired link 32*c* connects to data router 44. All identically numbered components are as described above.

Operation is as described for the embodiment shown in FIG. 5F, except that in this embodiment field device 52 sends the formatted message for network 12*b* to data router 44 of wireless device 36*b*. Data router 44 checks the address field of the message and either unpacks it for field device 62 or reformats the message for transmission by transceiver 40 in communication with network 12*b*. Transceiver 40, through antenna 42, then broadcasts the message into network 12*b* to be relayed to the destination node. A return message follows the reverse path back. Functionally the two separate networks 12*a* and 12*b* become unified wireless field device mesh network 10.

Figure 5H:
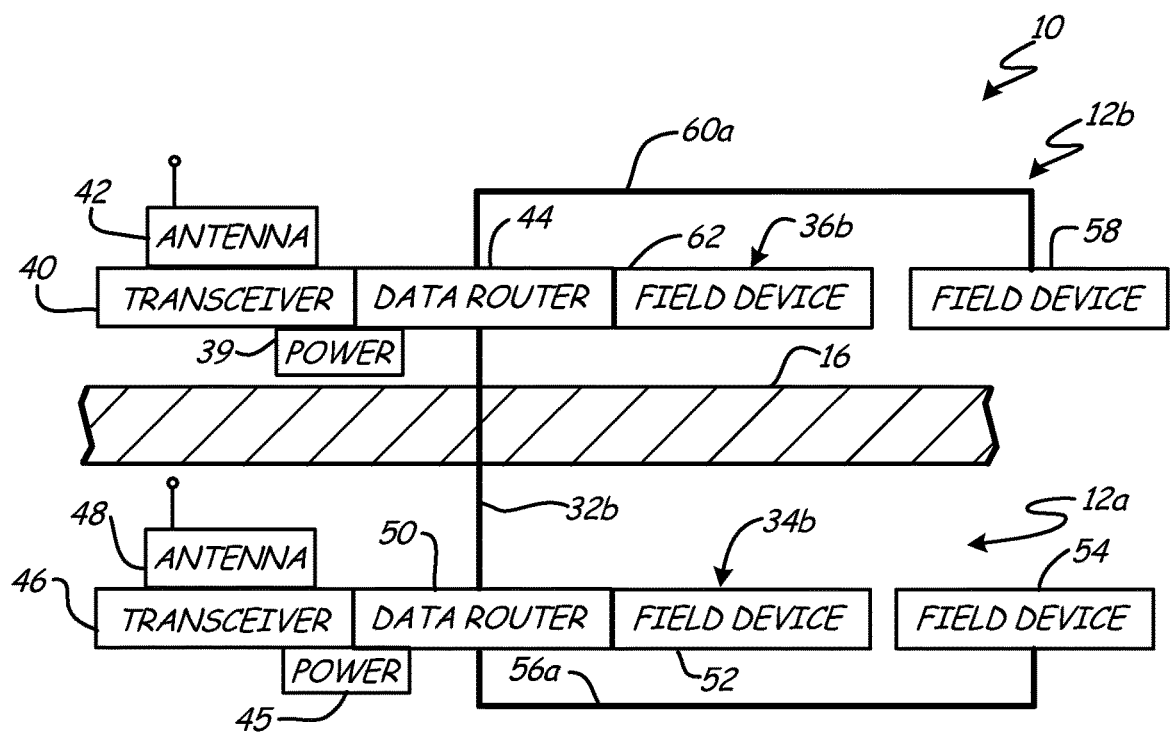

FIG. 5H is a block diagram of another embodiment of the bridging apparatus shown in FIG. 1 employing two wireless field devices to interconnect two wireless mesh networks through a barrier using an external wired link between them. This embodiment is identical to that shown in FIG. 5D, except for the addition of field device 58. All identically numbered components are as described above. Field device 58 is connected to data router 44 of wireless device 36*b* by wired link 60*a*. Power for field device 58 is either provided locally or remotely or by wireless device 36*b* through wired link 60*a*.

Operation is as described for the embodiment shown in FIG. 5D, except that when data router 44 checks the address field of the message, it either formats it for transmission to field device 58 over wired link 60*a* or formats the message for transmission by transceiver 40 in communication with network 12*b*. Transceiver 40, through antenna 42, then broadcasts the message into network 12*b* to be relayed to the destination node. A return message follows the reverse path back. Should the message be for field device 58, data router 44 sends the formatted message to field device 58 via wired link 60*a*. Field device 58, with no wireless capability of its own, is connected through wireless device 36*b* to unified wireless field device mesh network 10.

Figure 5I:
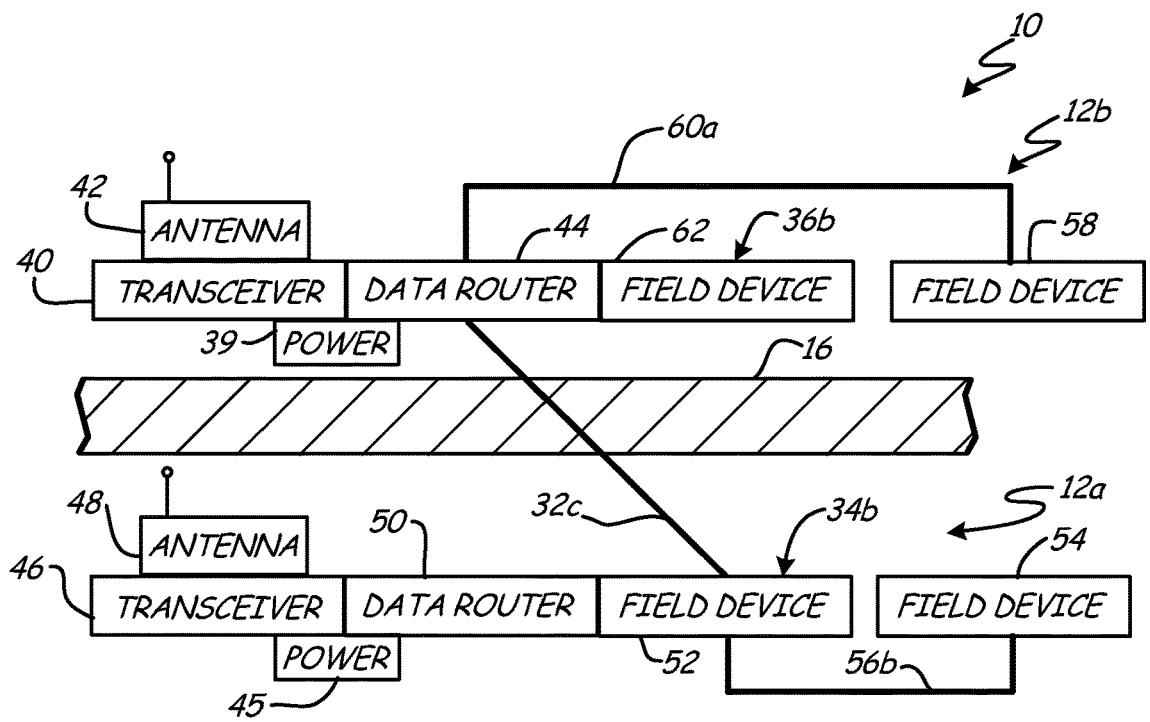

FIG. 5I is a block diagram of another embodiment of the bridging apparatus shown in FIG. 1 employing two wireless field devices to interconnect two wireless mesh networks through a barrier using an external wired link between them. This embodiment is identical to that shown in FIG. 5G, except for the addition of field device 58. All identically numbered components are as described above. Field device 58 is connected to data router 44 of wireless device 36*b* by wired link 60*a*. Power for field device 58 is either provided locally or remotely or by wireless device 36*b* through wired link 60*a*.

Operation is as described for the embodiment shown in FIG. 5G, except that when data router 44 checks the address field of the message, it either formats it for transmission to field device 58 over wired link 60*a* or formats the message for transmission by transceiver 40 in communication with network 12*b*. Transceiver 40, through antenna 42, then broadcasts the message into network 12*b* to be relayed to the destination node. A return message follows the reverse path back. Should the message be for field device 58, data router 44 sends the formatted message to field device 58 via wired link 60*a*. Field device 58, with no wireless capability of its own, is connected through wireless device 36*b* to unified wireless field device mesh network 10.

Figure 5J:
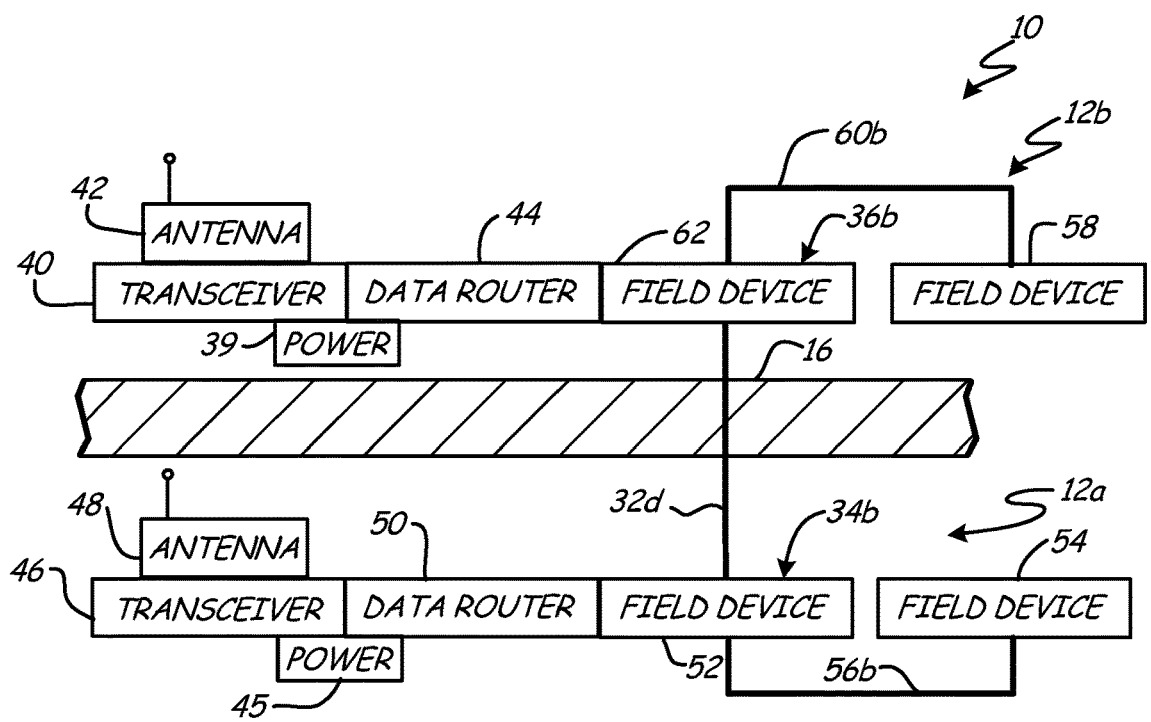

FIG. 5J is a block diagram of another embodiment of the bridging apparatus shown in FIG. 1 employing two wireless field devices to interconnect two wireless mesh networks through a barrier using an external wired link between them. This embodiment is identical to that shown in FIG. 5F, except for the addition of field device 58. All identically numbered components are as described above for FIG. 5F. Field device 58 is connected to field device 62 of wireless device 36*b* by wired link 60*b*. Wired link 60*b* is of any suitable type, for example, EIA/RS-485, Ethernet, or even a proprietary type. Communication between field device 58 and wireless device 36*b* employs a suitable communication protocol, for example, HDLC, Modbus®, HART®, Profibus®, Foundation Fieldbus®, TCP/IP, or DeviceNet®.

Operation is as described for the embodiment shown in FIG. 5F, except that when data router 44 checks the address field of the message, it unpacks it for field device 62, formats it for transmission to field device 58 over wired link 60*b* or formats the message for transmission by transceiver 40 in communication with network 12*b*. Should the message be for field device 58, data router 44 sends the formatted message for field device 58 to field device 62 and field device 62 sends the message to field device 58 via wired link 60*b*. Field device 58, with no wireless capability of its own, is connected through wireless device 36*b* to unified wireless field device mesh network 10.

While the embodiments illustrated in FIGS. 5A-5J show two local power sources, it is understood that the invention requires only one local power source for the bridging apparatus. For example, in FIG. 5A, wireless transceiver 36*b* may not be powered by its own power source 39 but powered by wireless device 34*b* over wired data link 32*b*. In such a case, both wireless devices 36*b* and 34*b* are locally-powered by power source 45.

Figure 6:
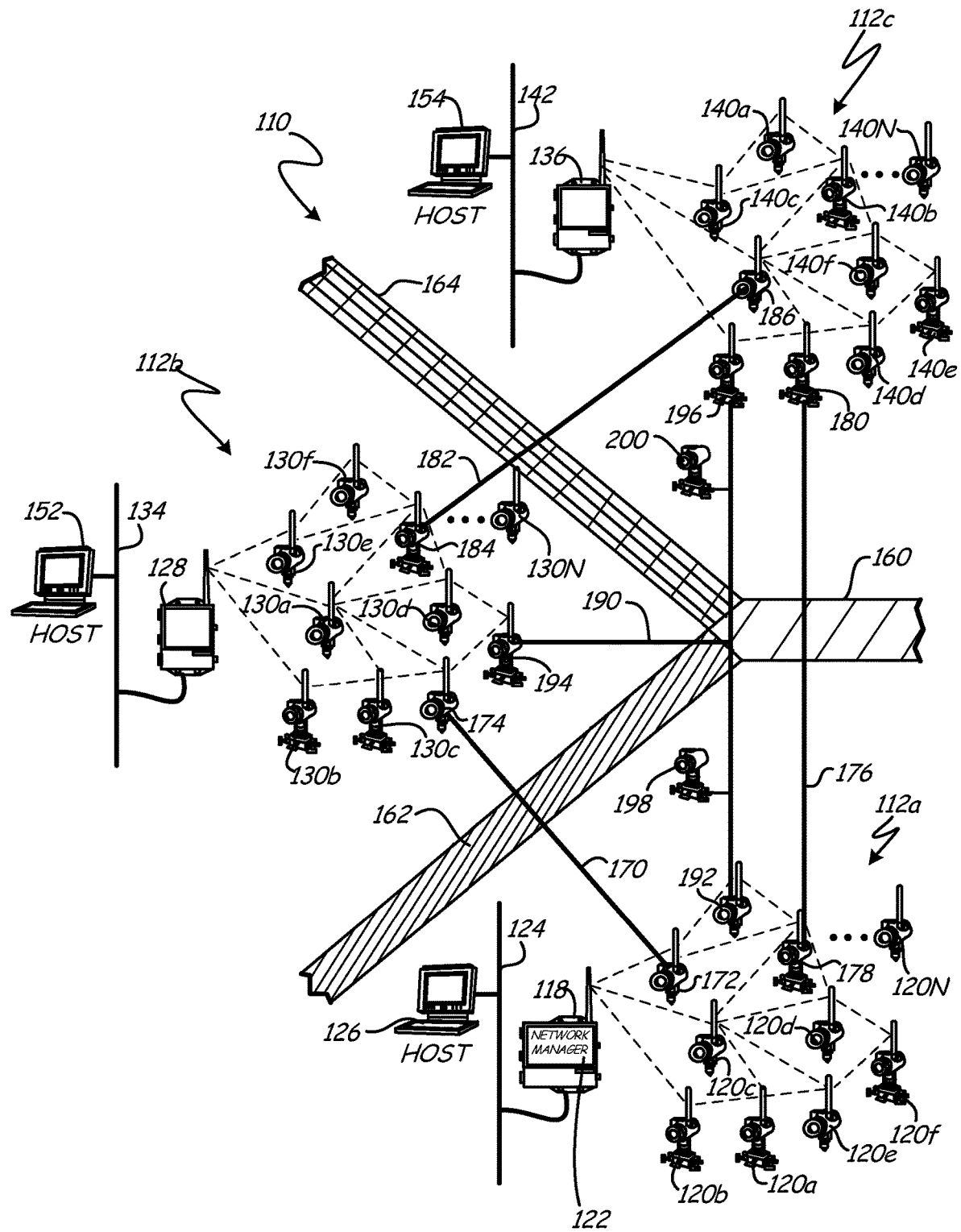
FIG. 6 is a diagram illustrating an implementation of an embodiment of the present invention interconnecting multiple wireless mesh networks through several barriers.

FIG. 6 is a block diagram illustrating an implementation of an embodiment of the present invention interconnecting multiple wireless mesh networks through several barriers. In FIG. 6, a plurality of wireless field device mesh networks, networks 112*a*, 112*b*, and 112*c*, are joined into unified wireless field device mesh network, 110. Networks 112*a*, 112*b*, and 112*c* are separated by barriers 160, 162, and 164 to wireless communication. Each network 112*a*, 112*b*, and 112*c* consists of a cloud of nodes, nodes 120*a*-120*f* . . . 120N, 130*a*-130*f* . . . 130N, 140*a*-140*f* . . . 140N respectively, that communicate with each other wirelessly. Each network 112*a*, 112*b*, and 112*c* is normally controlled by its own Network Manager, typically located in one of gateways 118, 128, and 136, respectively. Plant networks 124, 134, and 142 may have their own hosts 126, 152, and 154 and may not communicate with each other. In this illustration, Network Manager 122 residing on gateway 118 controls the unified wireless field device mesh network 110. Alternatively, the unified wireless field device mesh network 110 can be controlled by a Network Manager residing on one of gateways 128 and 136, on a computer remotely connected to one of gateways 118, 128, and 136, for example, host computers 126, 152 and 154, respectively, or a computer connected to one of plant networks 124, 134, and 142.

In order to integrate wireless field device mesh networks 112*a*, 112*b*, and 112*c* into a unified mesh network, several of the embodiments of the bridging apparatuses shown above, employing two locally-powered wireless devices to interconnect two wireless mesh networks through a barrier using an external wired link between them, are illustrated. Wired link 170 overcomes barrier 162 and connects locally-powered wireless data router 172 and locally-powered wireless data router 174, interconnecting wireless networks 112a and 112b, respectively, employing an embodiment of the type illustrated above in FIG. 3A. Wired link 176 overcomes barrier 160 and connects locally-powered wireless field device 178 and locally-powered wireless field device 180, interconnecting wireless networks 112a and 112c, respectively, employing an embodiment of the type illustrated above in FIGS. 5A-5C. Finally, wired link 182 overcomes barrier 164 and connects locally-powered wireless field device 184 and locally-powered wireless data router 186, interconnecting wireless networks 112b and 112c, respectively, employing an embodiment of the type illustrated above in FIGS. 4A-4B. Wired links 170, 176, and 182 are of any suitable type, for example, EIA/RS-485, Ethernet, or even a proprietary type. Wired links 170, 176, and 182 employ a suitable communication protocol, for example, HDLC, Modbus®, HART®, Profibus®, Foundation Fieldbus®, TCP/IP, or DeviceNet®.

In operation, if Network Manager 122 requires information stored on node 140a located in network 112c, a request is generated and sent to gateway 118 where it is broadcast into and relayed through network 112a. The message is passed through network 112a until it is received by wireless field device 178. Wireless field device 178 determines that the destination for the message exists in network 112c and sends the message over wired link 176 to wireless field device 180. Wireless field device 180 receives the message, formats the message for wireless transmission, and broadcasts the message into network 112c to be relayed to the destination node 140a. The return message follows a reverse path back to gateway 118 and Network Manager 122. If the intended destination node is in network 112b then the process for sending and receiving the message is the same except that it is sent from wireless data router 172 to wireless data router 174 over wired link 170 and that it is wireless data router 174 that formats the message for wireless transmission, and broadcasts the message into network 112b rather than 112c. Wireless field device mesh networks 112a, 112b, and 112c become unified wireless field device mesh network 110 where each host system 126, 152, and 154 has access to all of the nodes in any of the other networks and can receive information from or send control signals to any node as needed.

Another advantage of the present invention is that wired links 170, 176, and 182 together provide redundancy for improved connection reliability. If in the previous example, where Network Manager 122 requires information stored on node 140a located in network 112c, wired link 176 were off line, a connection path would still exist. For example, as before, the request is generated and sent to gateway 118 where it is broadcast into and relayed through network 112a. The message is passed through network 112a until it is received by wireless data router 172. Wireless data router 172 sends the message over wired link 170 to wireless data router 174. Wireless data router 174 receives the message, formats the message for wireless transmission, and broadcasts the message into network 112b to be relayed to wireless field device 184. Wireless field device 184 sends the message over wired link 182 to wireless data router 186. Wireless data router 186 receives the message, formats the message for wireless transmission, and broadcasts the message into network 112c to be relayed to the destination node 140a. The return message follows a reverse path back to gateway 118 and Network Manager 122.

FIG. 6 also illustrates another embodiment of the present invention interconnecting multiple wireless mesh networks through several barriers. In order to integrate wireless field device mesh networks 112a, 112b, and 112c into a unified mesh network, locally-powered wireless devices 192, 194, and 196 are connected together using wired data link 190. Wireless device 192 is in wireless communication with network 112a; wireless device 194 is in wireless communication with network 112b; and wireless device 196 is in wireless communication with network 112c. Wired data link 190 overcomes barriers 160, 162, and 162. Wired data link 190 employs a bus data protocol connecting locally-powered wireless devices 192, 194, and 196 to wired data link 190 in an individually addressable, multi-drop, multi-point fashion. Suitable bus types include, for example, EIA/RS-485 or Ethernet. Suitable bus data protocols include, for example, HDLC, Modbus®, HART®, Profibus®, Foundation Fieldbus®, TCP/IP, or DeviceNet®.

Typically, each locally-powered wireless device 192, 194, and 196 comprises its own local power source. However, like the embodiments illustrated in FIGS. 2A-5J, it is understood that the invention requires only one local power source to power wired data link 190 and connected devices. For example, in FIG. 6, if the local power source of wireless device 196 is sufficient to power wireless devices 192 and 194 in addition to wireless device 196, wireless devices 192 and 194 need not be powered by their own power sources and are locally-powered by wireless device 196 over wired data link 190.

If Network Manager 122 requires information stored on node 140a located in network 112c, a request is generated and sent to gateway 118 where it is broadcast into and relayed through network 112a. The message is passed through network 112a until it is received by wireless device 192. Wireless device 192 determines that the destination for the message exists in network 112c and sends the message over wired data link 190 to wireless device 196. Wireless device 196 receives the message, formats the message for wireless transmission, and broadcasts the message into network 112c to be relayed to the destination node 140a. The return message follows a reverse path back to gateway 118 and Network Manager 122. If the intended destination node is in network 112b then the process for sending and receiving the message is the same except that it is sent to wireless device 194 over wired data link 190 and that it is wireless device 194 that formats the message for wireless transmission, and broadcasts the message into network 112b rather than 112c. Wireless field device mesh networks 112a, 112b, and 112c become unified wireless field device mesh network 110 where each host system 126, 152, and 154 has access to all of the nodes in any of the other networks and can receive information from or send control signals to any node as needed.

Another feature of the embodiment illustrated in FIG. 6 is that field devices lacking wireless communication capability can also be integrated into unified wireless field device mesh network 110. Field devices 198 and 200 lack wireless communications capability. Field devices 198 and 200 are connected to wired data link 190 in multi-drop, multi-point fashion and, like wireless devices 192, 194, and 196, are individually addressable. If Network Manager 122 requires information stored on field device 200 located in network 112c, a request is generated and sent to gateway 118 where it is broadcast into and relayed through network 112a. The message is passed through network 112a until it is received by wireless device 192. Wireless device 192 determines that the destination for the message exists in network 112c and sends the message over wired data link 190 to field device 200. The return message follows a reverse path back to gateway 118 and Network Manager 122. Field device 200, with no wireless capability of its own, is connected through wireless device 192 to unified wireless field device mesh network 110.

Figure 7A:
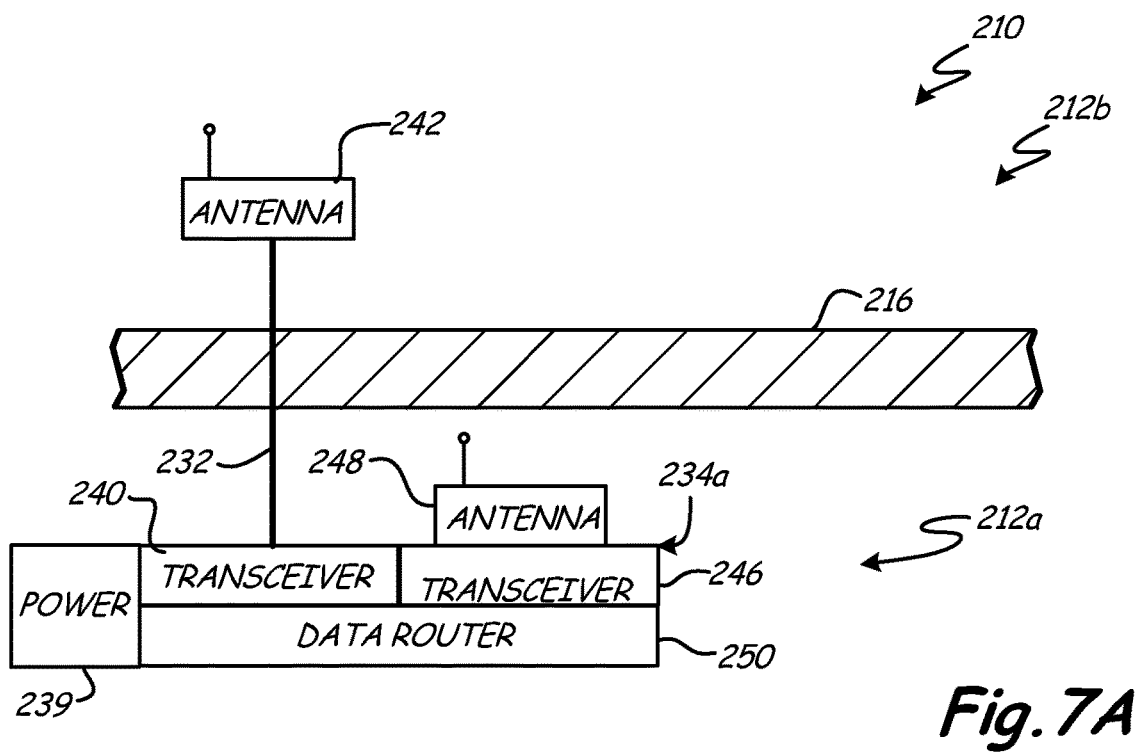
FIGS. 7A-7B are diagrams showing embodiments of the present invention employing a single data router controlling a pair of transceivers with separate antennae, each antenna placed in a different wireless mesh network, to interconnect the wireless mesh networks through a barrier using a wired link. The wired link consisting of RF cable.
Figure 7B:
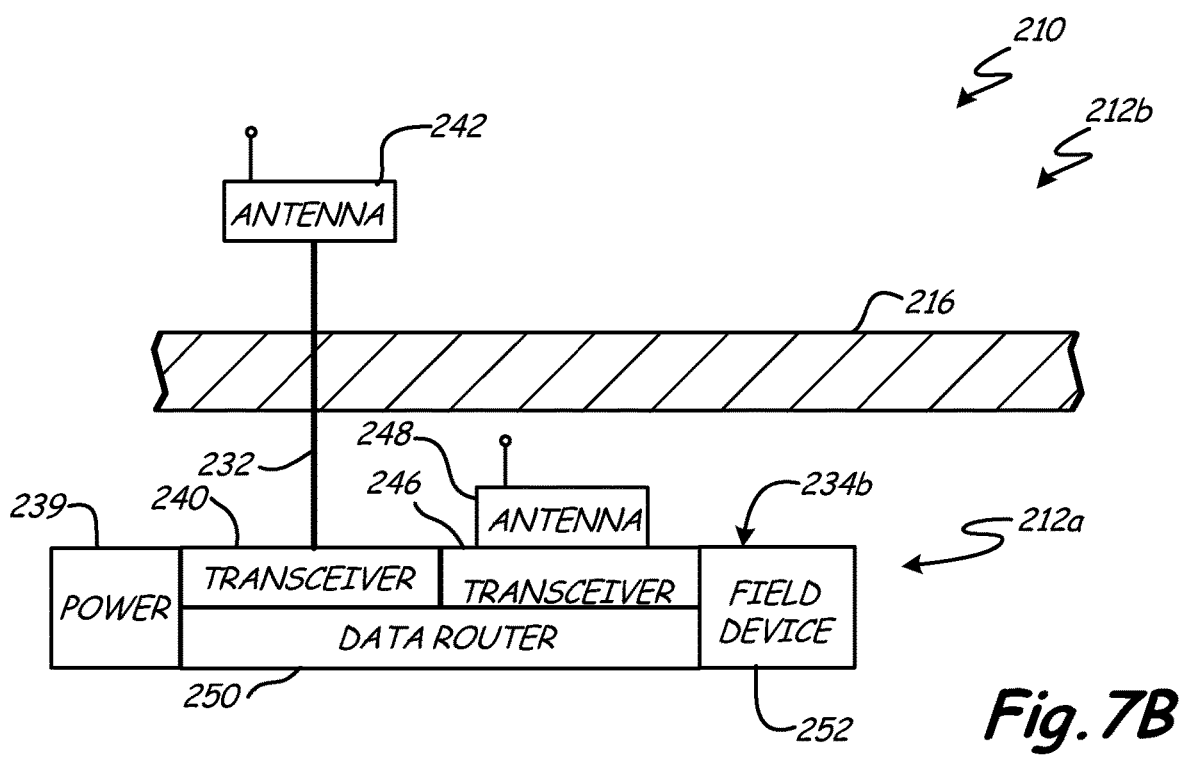

FIGS. 7A-7B are diagrams showing embodiments of the present invention employing a single data router controlling a pair of transceivers and two antennas, each antenna placed in a different wireless mesh network, to interconnect the wireless mesh networks through a barrier using a wired link.

FIG. 7A is a block diagram of one embodiment of the bridging apparatus of the present invention employing a single data router controlling a pair of transceivers and two antennae to interconnect two wireless mesh networks through a barrier using an external wired link. Unified wireless field device mesh network 210 is formed by wireless field device mesh networks 212a and 212b that are separated by barrier 216 to wireless communication. Wired link 232 overcomes barrier 216 and connects locally-powered wireless device 234a in wireless communication with network 212a and antenna 242 in wireless communication with network 212b. Wireless device 234a is a locally-powered wireless data router comprising local power source 239, transceiver 240, transceiver 246, antenna 248, and data router 250 integrated into a single package. Communication between transceiver 240 and data router 250 and between transceiver 246 and data router 250 employ a suitable local communication bus, for example, UART, CAN, or SPI®. Data router 250 controls both transceiver 240 and transceiver 246. Wired link 232 is a RF cable connected to transceiver 240 and antenna 242. Unlike the wired links used in the previous embodiments, wired link 232, as RF cabling, incurs signal losses that limit the distance the link can span.

According to one embodiment, local power source 239 comprises at least one of self-contained electrochemical sources (e.g., long-life batteries or fuel cells) and low-power energy-scavenging power sources (e.g., vibration, solar, or thermoelectric). Local power source 239 is integrated into its attached wireless device, as shown. Alternatively, such a local power source is physically separate, but electrically connected to provide power to the attached wireless device.

In operation, a message for a node in network 212b is relayed through network 212a until it reaches wireless device 234a. Transceiver 246, through antenna 248, receives the message and passes it to data router 250. Data router 250 checks the address field of the message and formats the message for transmission into network 212b. Data router 250 sends the formatted message to transceiver 240. Transceiver 240 then transmits the message via wired link 232 to antenna 242 and broadcasts the message into network 212b to be relayed to the destination node. A return message follows the reverse path back. Data router 250 reformats messages received from either transceiver 240 or 246 into a format suitable for broadcasting by the other transceiver 246 or 240 to allow the apparatus to bridge a barrier in differing network protocols. Functionally the two separate networks 212a and 212b become unified wireless field device mesh network 210.

FIG. 7B is a block diagram of another embodiment of the bridging apparatus of the present invention employing a single data router controlling a pair of transceivers and two antennae to interconnect two wireless mesh networks through a barrier using an external wired link. This embodiment is identical to that shown in FIG. 7A, except wireless data router 234a is replaced by wireless field device 234b. All identically numbered components are as described above. Wireless device 234b is a locally-powered wireless field device comprising local power source 239, transceiver 240, transceiver 246, antenna 248, data router 250, and field device 252 integrated into a single package. Communication between field device 252 and data router 250 employs a suitable local communication bus, for example, UART, CAN, or SPI®.

Operation is as described for the embodiment shown in FIG. 7A, except that in this embodiment data router 250 checks the address field of the message and either unpacks it for field device 252 or formats the message for transmission into network 212b. Functionally the two separate networks 212a and 212b become unified wireless field device mesh network 210.

The embodiments shown in FIGS. 7A-7B, as mentioned above, employ RF cabling for the wired link. RF cabling incurs signal losses that limit the distance the wired link can span to overcome a barrier to wireless communication. However, the present invention, in contrast to the prior art, does not employ a complex RF switch, which would increase cost, or an RF splitter which would severely limit the distance the wired link can span. For relatively short spans, e.g., through a wall, or for logical barriers, such as differences in network protocols, the embodiments of FIGS. 7A-7B may be the most cost effective solutions.

In all embodiments of the present invention, the wired link is powered solely by the connected locally-powered wireless devices. This is in contrast to prior art field device network buses where the bus itself is powered by an external source and may provide power to attached field devices. The present invention is ideally suited for locations where such external power is not readily available. To keep power low, the data rate of the wired link should be relatively high, at least on the same order as the data rate of the wireless protocol which it serves to connect. For example, with WirelessHART®, the wireless data rate is 250 Kbits/second, so the wired link data rate should be within approximately that same range of speed, for example, greater than 100 Kbits/second. Because the power efficiency of the wired link is much better than that for the wireless links, the wired link data rate can be somewhat lower than the wireless data rate without sacrificing too much of the available local power, such as battery life or energy scavenging output. Fast data rates allow the locally-powered wireless devices of the present invention to duty-cycle between ON, when they communicate quickly, and OFF, minimizing the ON time and reducing average power usage.

Interconnecting otherwise independent wireless field device networks to create a unified field device network increases efficiency by enabling a single Network Manager to manage and control the combined networks and by allowing nodes within a wireless network to query remote sensors and other nodes located in separate wireless field device networks directly. This increases the information immediately available throughout the unified field device network, allowing for more accurate and timely responses to changing events. The present invention provides a lower cost, lower loss, and lower power solution than current methods for routing inter-network communications around obstructions. Using a wired data link, instead of the current method consisting of a single radio with an RF splitter or RF switch and external RF cable linking multiple antennas, reduces signal loss dramatically. By reducing RF loss, the wireless device's power requirements are reduced making a locally-powered apparatus feasible. The present invention is easy to install. The wired link needs be only long enough to span the obstruction, avoiding costly long wiring runs required of an internet backbone or homerun linkages. Because the wireless device is easily programmed to use any standard network protocol, there is ready interoperability with current hardware in existing networks. Using multiple wireless devices also allows the present invention to connect networks which use different network protocols, making it easier to manage, upgrade and expand existing field device networks.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. An apparatus for bridging a barrier to wireless communication between a first wireless field device mesh network and a second wireless field device mesh network, the apparatus comprising:
    a first wireless device in wireless communication with the first wireless field device mesh network, the first wireless device comprising:
        a first data router;
        a first field device;
        a first local power source;
        a first transceiver; and
        a first antenna;
    a second wireless device in wireless communication with the second wireless field device mesh network, the second wireless device comprising:
        a second transceiver; and
        a second antenna; and
    a wired electrical transmission link directly connecting the first data router to the second wireless device, wherein the wired electrical transmission link spans the barrier to wireless communication between the first wireless field device mesh network and the second wireless field device mesh network to functionally form a unified wireless field device mesh network;
    wherein the first data router is configured to receive a message from the first wireless field device mesh network and determine a destination for the message as a function of whether the message is addressed to one of the first field device, another member of the first wireless field device mesh network, and a member of the second wireless field device mesh network;
    wherein the first data router, as a function of the destination for the message, is configured to:
        unpack the message for the first field device and send the unpacked message to the first field device when the first data router determines the destination for the message is the first field device;
        wirelessly forward the message to a member of the first wireless field device mesh network when the first data router determines the destination for the message is another member of the first wireless field device mesh network; and
        format the message for transmission and transmit the formatted message to the second wireless device over the wired electrical transmission link, the formatted message crossing the barrier to wireless communication via the wired electrical transmission link, when the first data router determines the destination for the message is the member of the second wireless field device mesh network; and
    wherein the second wireless device is powered by the first local power source through the wired link, and the wired link is powered exclusively by the first local power source.

2. The apparatus of claim 1, wherein the second wireless device further comprises a second data router.

3. The apparatus of claim 2, wherein the second data router is configured to receive a second message from the second wireless field device mesh network and determine a destination for the second message as a function of whether the second message is addressed to a member of the first wireless field device mesh network or another member of the second wireless field device mesh network.

4. The apparatus of claim 3, wherein the second data router, as a function of the destination for the second message, is configured to:
    forward the second message to a member of the second wireless field device mesh network when the second data router determines the destination for the message is another member of the second wireless field device mesh network; and
    format the second message for transmission and transmit the formatted second message to the second wireless device over the wired electrical transmission link, the formatted second message crossing the barrier to wireless communication via the wired electrical transmission link, when the second data router determines the destination for the second message is the member of the first wireless field device mesh network.

5. The apparatus of claim 2, wherein the second wireless device further comprises a second field device.

6. The apparatus of claim 5, wherein the second data router is configured to receive a second message from the second wireless field device mesh network and determine a destination for the second message as a function of whether the second message is addressed to the second field device, a member of the first wireless field device mesh network, or another member of the second wireless field device mesh network.

7. The apparatus of claim 6, wherein the second data router, as a function of the destination for the message, is configured to:
    unpack the second message for the second field device and send the unpacked second message to the second field device when the second data router determines the destination for the second message is the second field device;
    forward the second message to another member of the second wireless field device mesh network when the second data router determines the destination for the second message is another member of the second wireless field device mesh network; and
    format the second message for transmission and transmit the formatted second message to the first wireless device over the wired electrical transmission link, the formatted second message crossing the barrier to wireless communication via the wired electrical transmission link, when the second data router determines the destination for the second message is the member of the first wireless field device mesh network.

8. The apparatus of claim 5, wherein the second data router is configured to receive the message from the first data router via the wired electrical transmission link and determine a destination for the message as a function of whether the message is addressed to one of the second field device or another member of the second wireless field device mesh network.

9. The apparatus of claim 8, wherein the second data router, as a function of the destination of the message, is configured to:
reformat and unpack the message for the second field device and send the reformatted and unpacked message to the second field device when the second data router determines the destination for the message is the second field device; or
reformat the message for transmission over the wireless field device network and forward the reformatted message to another member of the second wireless field device mesh network when the second data router determines the destination for the message is another member of the second wireless field device mesh network.

10. The apparatus of claim 1, wherein the second wireless device further comprises a second field device.

11. The apparatus of claim 10, wherein the wired electrical transmission link directly connects the first data router to the second field device, and wherein the first data router is configured to unpack the message for the second field device, format the message for transmission, and transmit the formatted and unpacked message to the second field device over the wired electrical transmission link, the formatted and unpacked message crossing the barrier to wireless communication via the wired electrical transmission link when the first data router determines the destination for the message is the second field device.

12. The apparatus of claim 10, further comprising a third field device, wherein the third field device is electrically connected to and can communicate with the first wireless device, and wherein the third field device is physically separated from the first wireless device.

13. The apparatus of claim 12, further comprising a fourth field device, wherein the fourth field device is electrically connected to and can communicate with the second wireless device, and wherein the fourth field device is physically separated from the second wireless device.

14. The apparatus of claim 1, wherein the wired data link connects the field devices of the first wireless field device network and the second wireless field device network in multi-drop, multi-point fashion.

15. A method for bridging a barrier to wireless communication between a first wireless field device mesh network and a second wireless field device mesh network, the method comprising:
transmitting a message from a host through a single gateway to the first wireless field device mesh network;
routing the message in a hop by hop fashion through nodes of the first wireless network to a first locally-powered wireless device that is in wireless communication with and is one of the nodes of the first wireless device network;
receiving the message from the first wireless field device mesh network at the first locally-powered wireless device;
determining a location for a final destination node for the received message using a data router of the first locally-powered wireless device, wherein the location is within the second wireless field device network, is within the first wireless field device network, or is a field device associated with the first locally-powered wireless device;
wirelessly transmitting the message to another node of the first wireless field device network when the router determines the location is within the first wireless field device network;
unpacking the message for the field device to produce an unpacked message when the router determines the location is the field device;
transmitting the unpacked message to the field device;
formatting the message for transmission through the barrier to wireless communication when the router determines the location is within the second wireless field device network;
transmitting the formatted message through the barrier to wireless network communication to a second wireless device that is a node of the second wireless field device network using a wired link directly connecting the first locally-powered wireless device to the second wireless device, wherein the second wireless device is powered by the first locally-powered wireless device through the wired link, and the wired link is powered exclusively by the first locally-powered wireless device;
receiving the formatted message from the wired link at the second wireless device in wireless communication with the second wireless field device mesh network;
retransmitting the formatted message wirelessly into the second wireless field device mesh network using the second wireless device; and
routing the formatted message in a hop by hop fashion through the nodes of the second wireless network to the final destination node of the second wireless field device network.

16. The method of claim 15, wherein the method further comprises:
receiving a second message from the second wireless field device mesh network at a second router of the second wireless device;
determining a second location for a second final destination node using the second data router, wherein the second location is one of a node of the second wireless field device network or a node of the first wireless field device network;
forwarding the second message to another member of the second wireless field device network when the router determines the second location is within the second wireless field device network;
formatting the second message for transmission through the barrier to wireless communication when the router determines the second location is within the first wireless field device network; and
transmitting the formatted message through the barrier to wireless network communication to the first wireless using the wired link.

17. The method of claim 15, wherein the method further comprises:
receiving a second message from the second wireless field device mesh network at a second router of the second wireless device;
determining a second location for the second final destination node using the second data router, wherein the second location is one of a second field device of the second wireless device, another member of the second wireless field device network, or the first wireless field device network;

forwarding the second message to another member of the second wireless field device network when the router determines the second location is the second wireless field device network;
unpacking the second message for the second field device when the second router determines the second location is the second field device;
transmitting an unpacked second message to the second field device;
formatting the second message for transmission through the barrier to wireless communication when the router determines the second location is within the first wireless field device network; and
transmitting the message through the barrier to wireless network communication to the first wireless field device network using the wired link.

18. The method of claim 15, wherein the method further comprises:
receiving the message from the first wireless field device mesh network at a second router of the second wireless device; and
determining a location for the final destination node using the second data router, wherein the location is one of a second field device of the second wireless device or another member of the second wireless field device network.

19. The method of claim 18, wherein the method further comprises:
reformatting the message for transmission through the second wireless field device network when the router determines location is the first wireless field device network;
wirelessly transmitting the reformatted message to another member of the second wireless field device network;
unpacking and reformatting the message for the second field device when the router determines the location is the second field device; and
transmitting the unpacked and reformatted message to the second field device.

* * * * *